United States Patent [19]
Griffin et al.

[11] Patent Number: 5,880,737
[45] Date of Patent: Mar. 9, 1999

[54] METHOD AND SYSTEM FOR ACCESSING TEXTURE DATA IN ENVIRONMENTS WITH HIGH LATENCY IN A GRAPHICS RENDERING SYSTEM

[75] Inventors: Kent E. Griffin, Bellevue; Mark L. Kenworthy, Duvall; James E. Veres, Woodinville; Joseph W. Chauvin, Issaquah; Michael A. Toelle, Bellevue; Howard Good, Seattle, all of Wash.

[73] Assignee: Microsoft Corporation, Redmond, Wash.

[21] Appl. No.: 670,553

[22] Filed: Jun. 27, 1996

Related U.S. Application Data

[63] Continuation-in-part of Ser. No. 560,114, Nov. 17, 1995, abandoned, and a continuation of Ser. No. 511,553, Aug. 4, 1995, abandoned.

[51] Int. Cl.$^6$ .................................................. G06T 11/40
[52] U.S. Cl. .............................................................. 345/430
[58] Field of Search ................................... 345/419–420, 345/430–431, 433–7, 501–5

[56] References Cited

U.S. PATENT DOCUMENTS

| | | | |
|---|---|---|---|
| 4,631,690 | 12/1986 | Corthout et al. | 364/518 |
| 4,645,459 | 2/1987 | Graf et al. | 434/43 |
| 5,363,475 | 11/1994 | Baker et al. | 345/422 |
| 5,522,018 | 5/1996 | Takeda et al. | 345/422 |
| 5,563,989 | 10/1996 | Billyard | 345/426 |
| 5,586,234 | 12/1996 | Sakuraba et al. | 345/430 |
| 5,596,686 | 1/1997 | Duluk, Jr. | 345/122 |
| 5,598,517 | 1/1997 | Watkins | 345/441 |
| 5,630,043 | 5/1997 | Uhlin | 345/425 |
| 5,634,850 | 6/1997 | Kitahara et al. | 463/33 |
| 5,673,401 | 9/1997 | Volk et al. | 345/327 |
| 5,684,935 | 11/1997 | Demesa, III et al. | 345/419 |
| 5,729,669 | 5/1998 | Appleton | 345/422 |

OTHER PUBLICATIONS

Slater, Mel, "An Algorithm to support 3D Interaction on Relatively Low Performance Graphics Systems", *Comput. & Graphics*, vol. 16, No. 3, pp. 311–315, 1992.

Slater, Mel, "Segments on Bit–mapped Graphics Displays", *Software—Practice and Experience*, vol. 16(II), pp. 965–980, Nov. 1986.

Chrysanthou, Y and Slater, M, "Computing Dynamic Changes to BSP Trees", *Computer graphics Forum*, vol. II, No. 3, Conference Issue, pp. C–321 to C–342, Sep. 7–11, 1992.

Slater, Mel, et al, "Liberation from Rectangle: A Tiling Method for Dynamic Modification of Objects on Raster Displays", *Eurographics '88*, Conference date, Sep. 12–16, 1988, pp. 381–392, 1988.

(List continued on next page.)

*Primary Examiner*—Rudolph J. Buchel, Jr.
*Attorney, Agent, or Firm*—Klarquist Sparkman Campbell Leigh & Whinston LLP

[57] ABSTRACT

A system for accessing texture data in a graphics rendering system allows texture data to be stored in memories with high latency or in a compressed format. The system utilizes a texture cache to temporarily store blocks of texture data retrieved from an external memory during rendering operations. In one implementation, geometric primitives are stored in a queue long enough to absorb the latency of fetching and possibly decompressing a texture block. The geometric primitives are converted into texture block references, and these references are used to fetch texture blocks from memory. A rasterizer rasterizes each geometric primitives as the necessary texture data becomes available in the texture cache. In another implementation, geometric primitives are converted into pixels, including a pixel address, color data, and a texture request. These pixels are stored in a queue long enough to absorb the latency of a texture block fetch. The texture requests are read from the queue and used to fetch the appropriate texture blocks. As texture data becomes available in the texture cache, the texture data is sampled as necessary and combined with the pixel data read from the queue to compute output pixels.

35 Claims, 26 Drawing Sheets

OTHER PUBLICATIONS

Slater, Mel, et al, "Liberation from Flatland: 3D Interaction Based on the Desktop Bat", *Eurographics '91*, pp. 209–221, 1991.

Deering, "Explorations of Display Interfaces for Virtual Reality", *IEEE Virtual Reality*, 1993 International Symposium, pp. 141–147, 1993.

Reichlen, "Sparcchair: A One Hundred Million Pixel Display", *IEEE Virtual Reality, 1993 International Symposium*, pp. 300–307, May 28, 1993.

Foley, James D., et al, "Computer Graphics: Principles and Practices", *Addison–Wesley Publishing Co.*, 2nd ed. pp. 806–813, 885–921, 1990.

Collaborative work, "Pixel–Planes", Pixel Planes Home Page, url—http://www.cs.unc.edu/~pxpl/, University of North Carolina, pp. 1–25, update, Sep. 26, 1995.

Oak Technology WARP5 Press Releases, "Oak Technology Sets New Standard for 3D Realism with Breakthrough WARP 5 Chip Architecture", Atlanta, GA, Jun. 19, 1997.

Bergman, et al "Image Rendering by Adaptive Refinement", *ACM Siggraph '86*, vol. 20, No. 4, pp. 29–37, Aug. 18–22, 1986.

Chen, Chein–Liang, et al, "A Raster Engine for Computer Graphics and Image Compositing", Abstract, *APCCAS '94, IEEE*, pp. 103–108, Dec. 5–8, 1994.

Yoo, Terry S., et al, "Direct Visualization of Volume Data", *IEEE Computer Graphics and Applications Magazine*, vol. 12, No. 4, pp. 63–71, Jul. 92.

Bove, Jr., V. Michael, et al, "Real–Time Decoding and Display of Structured Video", *IEEE Multimedia, 1994 international Conference*, pp. 456–462, 1994.

Heb, Andreas, et al, "Three Dimensional Reconstruction of Brains from 2–Deoxyglucose Serial Section Autoradiographs", *Image Processing, 1994 International Conference*, vol. 3, pp. 290–294, 1994.

Hu, Lincoln, "Computer Graphics in Visual Effects", *COMPCON Spring '92, IEEE Computer Society International Conference*, pp. 472–474, 1992.

Runyon, Kenneth R., "Advanced Graphics Processor", *Digital Avionics Systems*, 1993 Conference, pp. 394–399, 1993.

Crawfis, Roger A., et al, "A Scientific Visualization Synthesizer", *Visualization*, 1991 Conference, pp. 262–267, 1991.

Haeberli, Paul, et al, "The Accumulation Buffer: Hardware Support for High–Quality Rendering", *ACM Computer Graphics*, vol. 24, No. 4, pp. 309–318, Aug. 1990.

Regan, Matthew and Ronald Pose, "Priority Rendering with a Virtual Reality Address Recalculation Pipeline", *ACM Siggraph, '94, Computer Grpahics Proceedings, Annual Conference Series*, pp. 155–162, 1994.

Regan, Matthew and Ronald Pose, "Low Latency Virtual Reality Display System", Technical report No. 92/166, Monash University, Victoria, Australia, pp. 1–13, Sep. 1992.

Regan, Matthew and Ronald Pose, "A Interactive Graphics Display Architecture", *IEEE Virtual Reality, 1993 International Symposium*, pp. 293–299, 1993.

Torborg, Jay, et al, "Talisman: Commodity Realtime 3D Graphics for the PC", *ACM Siggraph, Conference Proceedings*, pp. 353–363, Aug. 4–9, 1996.

Deering, Michael, et al, "Leo: A System for Cost Effective 3D Shaded Graphics", *ACM Siggraph, Conference Proceedings*, pp. 101–108, Aug. 1–6, 1993.

Akerly, Kurt, "RealityEngine Graphics", *ACM Siggraph, Conference Proceeding*, pp. 109–116, Aug. 1–6, 1993.

Mcmillan, Leonard, et al, "Plenoptic Modeling: An Image-–Based Rendering System", *ACM Siggraph, Conference Proceedings*, pp. 39–46, Aug. 6–11, 1995.

Tan, Wee–Chiew, et al, "Low–Power polygon Renderer for Computer Graphics", *Application Specific Array Processors*, 1993 International Conference, pp. 200–213, 1993.

Bae, Seong–Ok, et al, "Patch Rendering: A New Parallel Hardware Architecture for Fast Polygon Rendering", *Circuits and Systems, 1991 IEEE International Symposium*, pp. 3070–3073, 1991.

METHOD AND SYSTEM FOR ACCESSING TEXTURE DATA IN ENVIRONMENTS WITH HIGH LATENCY IN A GRAPHICS RENDERING SYSTEM

REFERENCE TO PRIOR APPLICATIONS

This is a continuation-in-part of application Ser. No. 08/560,114, filed Nov. 17, 1995 now abandoned. Application Ser. No. 08/560,114 is a continuation of application Ser. No. 08/511,553, filed Aug. 4, 1995, which is now abandoned.

TECHNICAL FIELD

The invention generally relates to graphics rendering of graphical models, and more specifically relates to methods and systems for accessing texture data in high latency environments.

BACKGROUND

Graphics rendering generally refers to the process of converting graphical models into a display image. The display image is typically comprised of an array of pixel data, sometimes referred to as a bitmap or pixmap. This array of pixel data maps to picture elements in the display screen of a display device. To display an image, a display controller transfers the pixel data to a display device, where it is used to illuminate the picture elements or "pixels" of a display screen. For example in color images, the pixel data can include red, green and blue color intensity values used to illuminate the pixels of color display screen.

Though there are a variety of display technologies, one of the most widely used is raster display technology. A raster display device includes an array of individual points or picture elements (i.e., pixels), arranged in rows and columns. In a CRT, these pixels correspond to a phosphor array provided on the glass faceplate of the CRT. The emission of light from each phosphor in the array is independently controlled by an electron beam that "scans" the array sequentially, one row at a time, in response to stored intensity values representative of each pixel in the image.

In 3D graphics applications, an object in a scene is represented by a 3D graphical model, which includes geometric data used to model the surface and position of the object, and visual attributes used to model the appearance of the object. There are a number of ways that a geometric model can represent a 3D object, including polygon meshes, parametric surfaces, or quadratic surfaces. Using a polygon mesh, for example, the surface of an object is modeled with several interconnected polygons. The surface elements, in this case polygons, are referred to as geometric primitives. Visual attributes such as red, green, and blue color data, and possibly other model data is stored at the vertices of the polygon.

In a process called scan converting or rasterizing, the geometric primitives forming the surface of the graphical model are converted into an array of discrete pixel data. In the context of 3D graphics, the visible surfaces of the objects in a scene are converted into an array of pixels. For surfaces represented with a mesh of polygons, for example, color intensity values stored at the vertices of each polygon are interpolated to compute intensity values at each of the discrete pixel elements covered by a polygon.

To create more realistic and detailed imagery, interpolated color values alone are not sufficient to create a realistic image. Often, additional image data stored separately from the model must be used to improve image quality. For example, image data referred to as a texture map is often used to represent intricate detail on the surface of a graphical model. In a process called texture mapping, a digital image called a texture map is mapped to the surface of a graphical model. In addition to texture maps, other image data external to the graphical model is sometimes used to compute pixel data. For example color and opacity data is sometimes used to perform lighting and shading operations. As another example, a shadow map is sometimes used to compute shadows cast by objects in a scene.

Texture mapping and other forms of rendering operations that require access to additional image data place tremendous demands on a graphics rendering system. In a typical texture mapping operation, the graphics rendering system has to retrieve at least one sample of texture data to compute each pixel. To generate high quality images without artifacts, the need to retrieve more samples of texture data increases because several texture samples are filtered or re-sampled to compute every pixel.

In real time systems, a new display image must be generated every fraction of a second. This rigorous timing requirement places severe constraints on texture mapping because there is limited time to retrieve texture data. The quality of the final image often suffers because sampling and/or filtering several texture cannot be performed due to the memory bandwidth limitations of the system. Support for high bandwidth access to texture data requires dedicated, fast and expensive memory systems.

A significant side effect of the memory bandwidth problem outlined above is that it makes it difficult, if not impossible, to store texture data in compressed form. Texture data is typically not stored in compressed form because there is not enough time to decompress texture data in a graphics rendering pipeline. As a result, memory requirements to store texture data can be substantial. The need for additional memory adds further to the expense of the system.

SUMMARY OF THE INVENTION

To address these and other drawbacks, the invention provides improved methods and systems for accessing texture data. While the invention is particularly well suited for texture mapping, it also supports additional rendering operations that require access to texture memory.

In one embodiment, geometric primitives in input data stream are stored in a first queue long enough to absorb the latency of fetching a block of texture data from memory. The geometric primitives in the first queue are converted into a texture block references, which are stored in a second queue. The texture blocks referenced in this second queue are fetched from memory and placed in a texture cache. One by one, each primitive in the queue is rasterized. As each primitive is rasterized, texture data is retrieved from the texture cache as necessary to compute the output pixels for the current primitive. Primitives are removed from the queue after they are rasterized.

In second embodiment, primitives are rasterized and the resulting pixel data is placed in a queue long enough to absorb the latency of a texture block fetch. In one specific implementation, the entries in the queue include a pixel address, color data for that address, and a texture request comprised of the center point of a texture sample in the coordinates of a texture map. The texture requests are read from the queue and converted into texture block addresses. The texture blocks are fetched and placed in a texture cache. The entries in the queue are retrieved from the queue, and associated texture data now in the texture cache is used to compute output pixels.

Both approaches outlined above enable texture to be accessed efficiently using a texture cache. Texture data can be stored in lower cost memory with higher latency. In addition, texture data can be even be stored in a compressed format despite the additional latency associated with decompressing the texture data.

DETAILED DESCRIPTION

System Overview

In the following detailed description, we describe several embodiments with reference to an image processing system.

The image processing system supports real time image rendering and generation for both graphics and video processing. Due to the novel architecture and image processing techniques employed in the system, it can produce sophisticated real time 3-D animation at a significant cost savings over present graphics systems. In addition to graphics processing, the system supports video processing such as video editing applications, and can also combine video and graphics. For instance, the system can be used to apply video to graphical objects, or conversely, can be used to add graphical objects to video data.

The system supports a wide range of interactive applications. Its ability to support advanced real time animation makes it well-suited for games, educational applications, and a host of interactive applications. The system supports sophisticated user interfaces including 3-D graphics or combined graphics and video. Improving upon the limited graphics capabilities of today's windowing environments for personal computers, the system can support improved 3-D graphical user interfaces for applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

Figure 1:
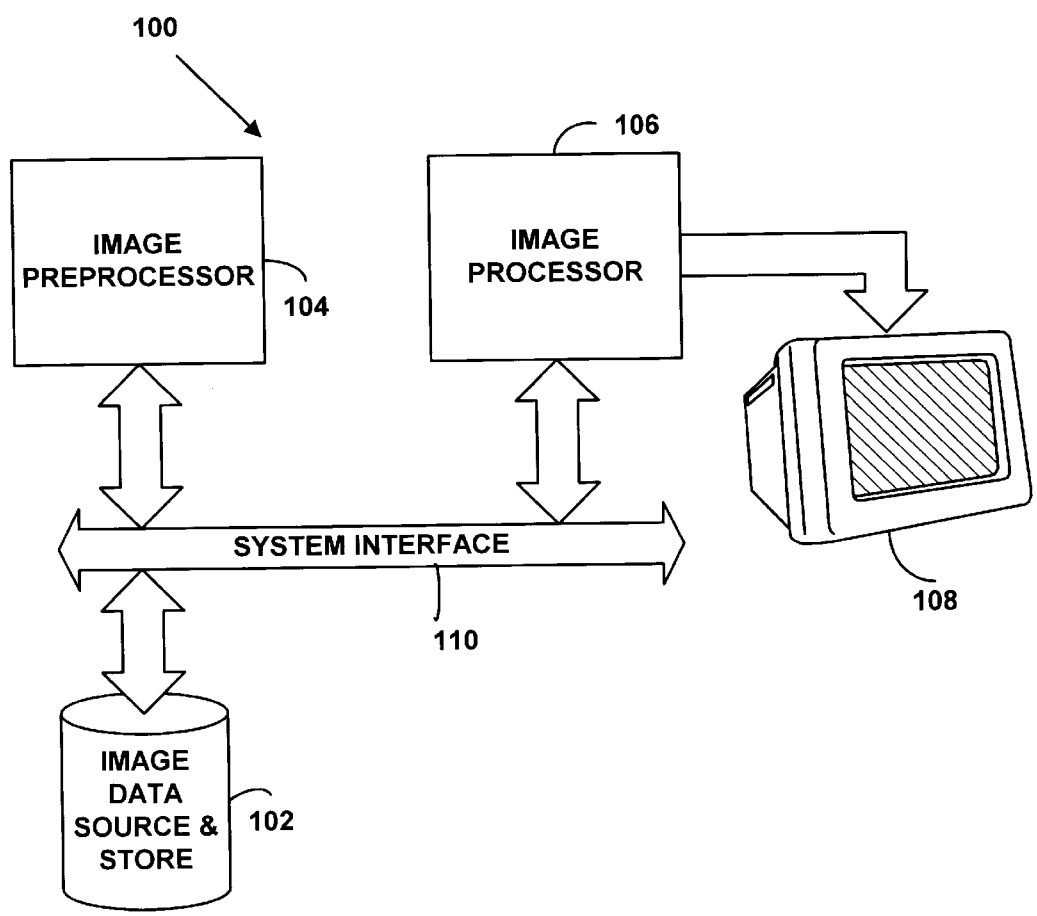
FIG. 1 is a block diagram of an image processing system.

FIG. 1 is a block diagram of the image processing system 100. The image processing system comprises an image data source and store 102, an image preprocessor 104, an image processor 106, and a display device 108, if immediate display of rendered images is desired. The elements in the system communicate through a system interface 110. The image data source and store 102 supplies image data to the system, and stores image data and commands. The image preprocessor 104 is responsible for manipulating the image data to prepare it for rendering. Examples of preprocessing functions include: defining objects in terms of geometric models, defining lighting and shadowing models, determining object locations, determining the location of a viewpoint and light sources, and geometry processing.

The image processor 106 renders the images, and generates a display image to be displayed on the display device 108. Rendering refers to the process of creating images from models and includes such functions as geometry processing (note that geometry processing can also be a preprocessing function), visible-surface determination, scan conversion, and lighting, to name a few. After rendering an image or parts of an image, the image processor 106 transfers rendered image data to the display device for display.

Below, we describe several features of the image processing system 100 in detail with reference to specific hardware and software architectures. However, it is important to note that the image processing described below can be implemented in a variety of alternative architectures.

The image processing system 100 achieves a vast price-performance improvement over existing high quality 3-D graphics systems known to the inventors. A number of advances in computer graphics contribute to this improvement. These advances include: composited image layers, image compression, chunking, and multi-pass rendering. We introduce these advances here, and describe these and other advances in more detail below.

Composited Image Layers (Gsprites)

In our system, multiple independent image layers may be composited together at video rates to create the output video signal. These image layers, which we refer to as generalized gsprites, or gsprites, can be rendered into and manipulated independently. The system will generally use an independent gsprite for each non-interpenetrating object in the scene. This allows each object to be updated independently, so that object update rate can be optimized based on scene priorities. For example, an object that is moving in the distant background may not need to be updated as often, or with as much accuracy, as a foreground object.

Gsprites can be of arbitrary size and shape. In one implementation, we use rectangular gsprites. Pixels in the gsprite have color and alpha (opacity) information associated with them, so that multiple gsprites can be composited together to create the overall scene.

Several different operations may be performed on gsprites at video rates, including scaling, rotation, subpixel positioning, and transformations to mimic motion, such as affine warps. So, while gsprite update rates are variable, gsprite transformations (motion, etc.) may occur at full video rates, resulting in much more fluid dynamics than could be achieved by a conventional 3-D graphics system that has no update rate guarantees.

Many 3-D transformations can be simulated by 2-D imaging operations. For example, a receding object can be simulated by scaling the size of the gsprite. By utilizing 2-D transformations on previously rendered images for intermediate frames, overall processing requirements are significantly reduced, and 3-D rendering power can be applied where it is needed to yield the highest quality results. This is a form of temporal level of detail management.

By using gsprite scaling, the level of spatial detail can also be adjusted to match scene priorities. For example, background objects, cloudy sky, etc., can be rendered into a small gsprite (low resolution) which is then scaled to the appropriate size for display. By utilizing high quality filtering, the typical low resolution artifacts are not as noticeable.

A typical 3-D graphics application (particularly an interactive game) trades off geometric level of detail to achieve higher animation rates. Gsprites allow the system to utilize two additional scene parameters—temporal level of detail and spatial level of detail- to optimize the effective performance as seen by the user. The spatial resolution at which the image of an object is rendered does not have to match the screen resolution at which it will be rendered. Further, the system can manage these trade-offs automatically without requiring application support.

Image Compression

Perhaps the most significant factor in determining system cost and performance is memory. A traditional high-end 3-D graphics system, for example, has over 30 Mbytes of memory, including frame buffers (double buffered), a depth buffer, a texture buffer, and an anti-aliasing buffer. And most of this is specialized memory which is significantly more expensive than DRAM. Memory bandwidth is always a critical bottleneck. The cost of high performance systems are often driven by the need to provide numerous banks of interleaved memory to provide adequate bandwidth for pixel and texture data accesses.

The system broadly applies image compression technology to solve these problems. Image compression has traditionally not been used in graphics systems because of the computational complexity required for high quality, and because it does not easily fit into a conventional graphics architecture. By using a concept we call chunking (described below), we are able to effectively apply compression to images and textures, achieving a significant improvement in price-performance.

In one respect, graphics systems have employed compression to frame buffer memory. High end systems utilize eight bits for each of three color components, and often also include an eight bit alpha value. Low end systems compress these 32 bits per pixel to as few as four bits by discarding information and/or using a color palette to reduce the number of simultaneously displayable colors. This compression results in very noticeable artifacts, does not achieve a significant reduction in data requirements, and forces applications and/or drivers to deal with a broad range of pixel formats.

The compression used in our system can achieve very high image quality yet still provide compression ratios of 10:1 or better. Another benefit of our approach is that a single high quality image format can be used for all applications, as distinguished from the standard PC graphics architecture which requires a trade-off between spatial resolution and color depth.

Chunking

Another significant advance in our system is referred to as chunking. A traditional 3-D graphics system (or any frame buffer for that matter), can be (and is) accessed randomly. Arbitrary pixels on the screen can be accessed in random order. Since compression algorithms rely on having access to a fairly large number of neighboring pixels (in order to take advantage of spatial coherence), compression can only be applied after all pixel updates have been made, due to the random access patterns utilized by graphics algorithms. This makes the application of compression technology to display buffers impractical.

This random access pattern also means that per-pixel hidden surface removal and anti-aliasing algorithms must maintain additional information for every pixel on the screen. This dramatically increases the memory size requirements, and adds another performance bottleneck.

Our system takes a different approach. A scene, or portions of a scene, can be divided into pixel regions (32×32 pixels in one specific implementation), called chunks. In one implementation, the system divides the geometry assigned to gsprites into chunks, but an alternative implementation could perform chunking without gsprites. The geometry is presorted into bins based on which chunk the geometry will be rendered into. This process is referred to as chunking. Geometry that overlaps a chunk boundary is preferably referenced in each chunk it is visible in. As the scene is animated, the data structure is modified to adjust for geometry that moves from one chunk to another.

Chunking provides several significant advantages. The use of chunking provides an effective form of compression. Since all the geometry in one chunk is rendered before proceeding to the next, the depth buffer need only be as large as a single chunk. By using a relatively small chunk size such as 32×32 pixels, the depth buffer can be implemented directly on the graphics rendering chip. This eliminates a considerable amount of memory, and also allows the depth buffer to be implemented using a specialized memory architecture which can be accessed with very high bandwidth and cleared during double buffer operations, eliminating the traditional frame buffer memory clearing overhead between frames.

Anti-aliasing is also considerably easier since each chunk can be dealt with independently. Most high-end Z-buffered graphics systems which implement anti-aliasing utilize a great deal of additional memory, and still perform relatively simplistic filtering. With chunking however, the amount of data required is considerably reduced (by a factor of 1000), allowing practical implementation of a much more sophisticated anti-aliasing algorithm.

In addition to Z-buffering and anti-aliasing, the system can also simultaneously support translucency in a correct and seamless manner. While a chunk is being built, the system can perform both anti-aliasing and translucency computations on another chunk. In other words, in the time required to build a chunk, the system can perform anti-aliasing and translucency processing on another chunk. The system can "ping-pong" between chunks, and thus perform sophisticated processing without adding delay in processing an image for real time applications.

Yet another advantage is that chunking enables block oriented image compression. Once a chunk has been rendered (and anti-aliased), it can then be compressed with a block transform based compression algorithm. Therefore, in addition to the compression achieved from rendering chunks separately, chunking supports more sophisticated and adaptable compression schemes.

Multi-Pass Rendering

Another advantage of the architecture of our system is the opportunity for 3-D interactive applications to break out of the late 1970's look of CAD graphics systems: boring lambertian Gouraud-shaded polygons with Phong highlights. Texture mapping of color improves this look but imposes another characteristic appearance on applications. In the 1980's, the idea of programmable shaders and procedural texture maps opened a new versatility to the rendering process. These ideas swept the off-line rendering world to create the high-quality images that we see today in film special effects.

The rigid rendering pipelines and fixed rendering modes of today's typical high-end 3-D graphics workstations make it impossible to implement such effects without drastic reductions in real-time performance. As a result, users who require real-time display must put up with the limited rendering flexibility.

By reducing the bandwidth requirements using the techniques outlined above, the system of the present invention can use a single shared memory system for all memory requirements including compressed texture storage and compressed gsprite storage. This architecture allows data created by the rendering process to be fed back through the texture processor to use as data in the rendering of a new gsprite. Because of this support for feedback, the system can perform efficient multi-pass rendering.

By coupling efficient multi-pass rendering with a variety of compositing modes and a flexible shading language, the system can provide a variety of rendering effects in real-time that have previously been the domain of off-line software renderers. This includes support of functions such as shadows (including shadows from multiple light sources), environment mapped reflective objects, spot lights, ground fog, realistic underwater simulation, etc.

In one embodiment, the image processing system (100) includes a combination of software and hardware. In the following section, we describe the system environment below with reference to a hardware and software architecture. Where possible, we describe alternative architectures. However, the software and hardware architectures can vary, and therefore are not limited to the specific examples provided below.

The image processing system, or portions of it, can be implemented in a number of different platforms including desktop computers, set-top boxes, and game systems.

Figure 2:
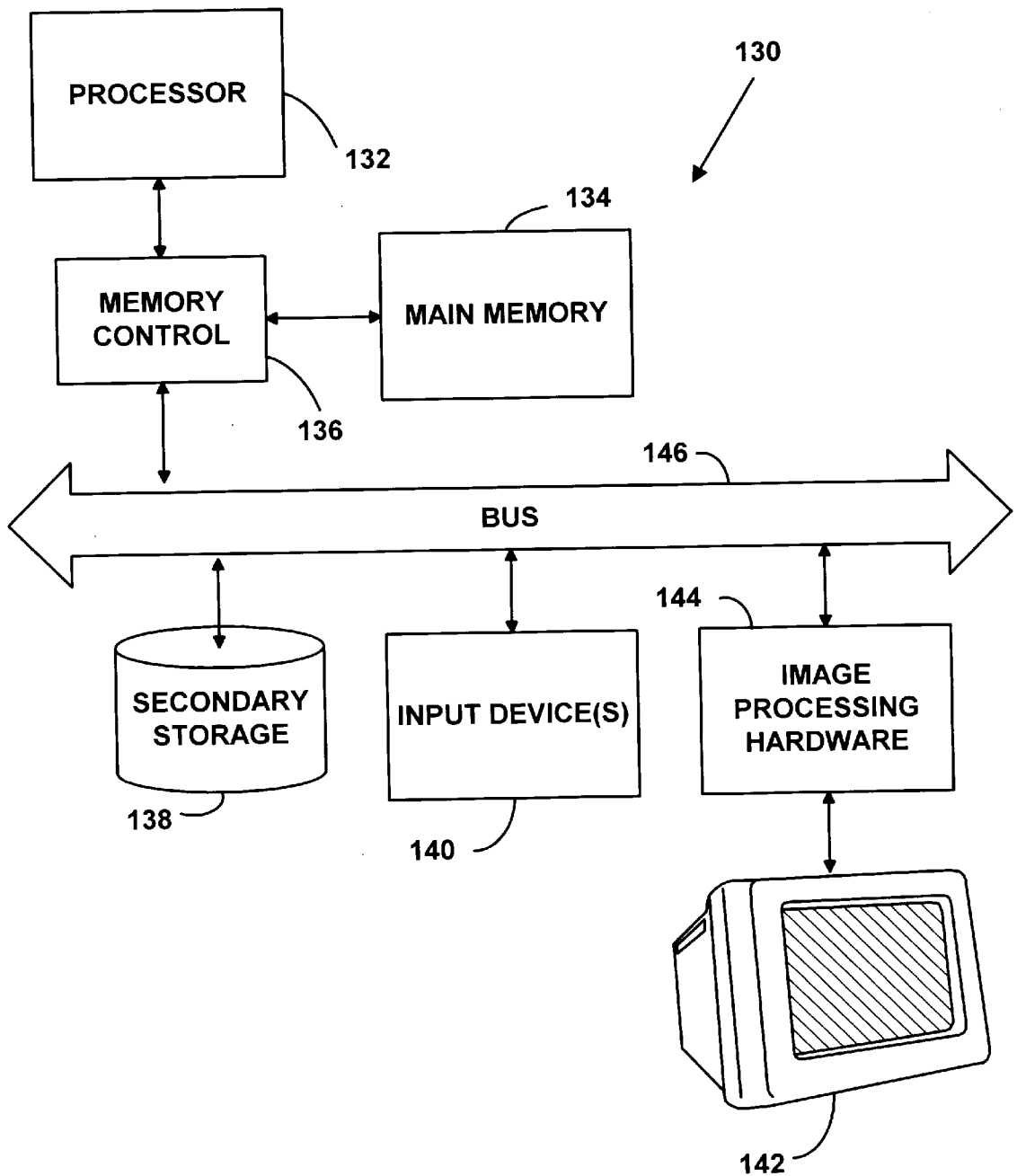
FIG. 2 is a block diagram of the system environment for an embodiment of the invention.

FIG. 2 is a block diagram of a computer system 130 in which the image processing system can be implemented. The computer system 130 includes a processor 132, main memory 134, memory control 136, secondary storage 138, input device(s) 140, display device 142, and image processing hardware 144. Memory control 136 serves as an interface between the processor 132 and main memory 134; it also acts as an interface for the processor 132 and main memory 134 to the bus 146.

A variety of computer systems have the same or similar architecture as illustrated in FIG. 2. The processor within such systems can vary. In addition, some computer systems include more than one processing unit. To name a few, the processor can be a Pentium or Pentium Pro processor from Intel Corporation, a microprocessor from the MIPS family from Silicon Graphics, Inc., or the PowerPC from Motorola.

Main memory 134 is high speed memory, and in most conventional computer systems is implemented with random access memory (RAM). Main memory can interface with the processor and bus in any of variety of known techniques. Main memory stores 134 programs such as a computer's operating system and currently running application programs. Below we describe aspects of an embodiment with reference to symbolic representations of instructions that are performed by the computer system. These instructions are sometimes referred to as being computer-executed. These aspects of the embodiment can be implemented in a program or programs, comprising a series of instructions stored on a computer-readable medium. The computer-readable medium can be any of the devices, or a combination of the devices described herein, in connection with main memory or secondary storage.

The bus 146 interconnects the memory control 136, secondary storage 138, and the image processing hardware 144. In one implementation for example, the bus is a PCI bus. The PCI standard is well-known, and several computer system boards are designed to support this standard. Computer systems having other bus architectures can also support the image processing system. Examples include an ISA bus, EISA bus, VESA local bus, and the NuBus.

The display device 142 is a color display, with continuous refresh to display an image. The display device in one embodiment is a cathode ray tube (CRT) device, but it can also be a liquid crystal display (LCD) device, or some other form of display device.

The secondary storage device 138 can include a variety of storage media. For example, the secondary storage device can include floppy disks, hard disks, tape, CD-ROM, etc. and other devices that use electrical, magnetic, optical or other recording material.

The input device(s) 140 can include a keyboard, cursor positioning device such as a mouse, joysticks, as well as a variety of other commercially available input devices.

In one implementation detailed below, the image processing hardware 144 is implemented on board that couples with the computer system through a PCI bus. In an alternative implementation, the image processing hardware can be located on a system board along with a processor or other image processing hardware and memory. For example, in a game system, image processing hardware is typically located on the mother board. Similarly, image processing hardware in a set-top box can also be located on the mother board.

While we have outlined the architecture of a computer system, we do not intend to limit our invention to the system architecture illustrated in FIG. 2. Our image processing system can be implemented in game systems, set-top boxes, video editing devices, etc. Below we describe an embodiment of an image processing system in the environment of the system architecture shown in FIG. 2. We describe alternative implementations throughout the following description, but we do not intend our description of alternatives to be a complete listing of other possible implementations. Based on our detailed description below, those having ordinary skill in the art can implement our the image processing system, or aspects of it, on alternative platforms.

Figure 3:
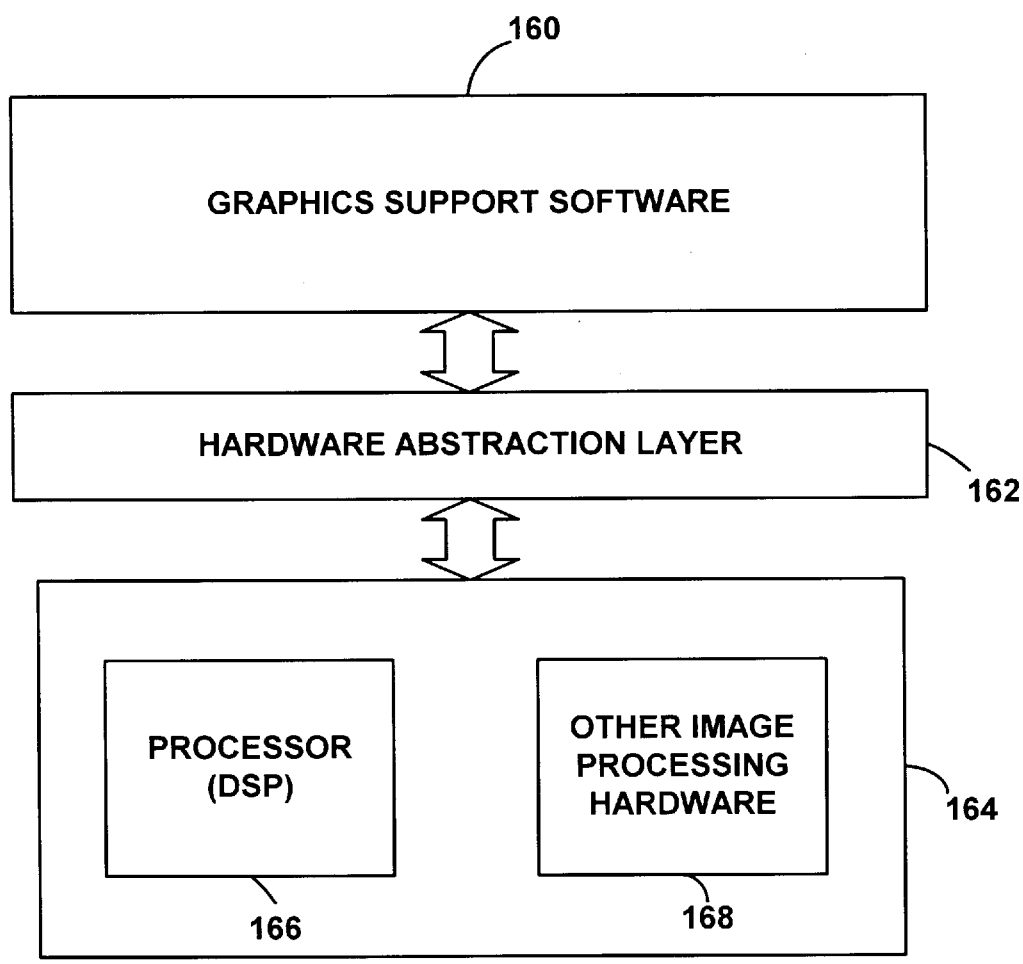
FIG. 3 is a block diagram of system architecture for an embodiment.

FIG. 3 is a block diagram illustrating the relationship between the software and hardware in one embodiment. In this embodiment, the image processing system is implemented using processing resources of the processor of the host computer and the image processing hardware 144. The image processing hardware 144 is implemented on an expansion board 164 which includes a processor (e.g. a Digital Signal Processor) 166 and image processing circuitry 168. The processors of the host computer 130 and the image processing board 164 share image processing tasks. Below we outline generally the functions performed by the host computer 130 and the image processing board 174.

Graphics support software 160 executes on the host computer system 130 and communicates with the image processing board 164 through the hardware abstraction layer (HAL) 162. The image processing board 164 includes a programmable digital signal processor called the DSP 166 and additional image processing hardware 168 detailed below.

The graphics support software 160 can include functions to support memory management, view volume culling, depth sorting, chunking, as well as gsprite allocation, transformation, and level of detail. The graphics support software can include a library of graphics functions, accessible by graphics applications, to perform the functions enumerated here.

The graphics support software 160 includes functions that support the gsprite paradigm introduced above. As indicated above, gsprites are rendered independently, and do not need to be rendered on every frame. Instead, changes in position of a gsprite can be approximated with affine or other transformations. The graphics support software 160 provides functions to help assign an object or objects to a gsprite and to track motion data describing the position and motion of the gsprite. The graphics support software also provides functions to determine when a rendered gsprite needs to be updated. The need to update a gsprite can vary depending on object movement, viewpoint movement, lighting changes, and object collisions.

We provide further detail with respect to the functions of the graphic support software below. The image processing board 164 performs low level geometry processing, including transforms, lighting and shading, texturing, anti-aliasing, translucency, etc. In one embodiment, the DSP 166 is responsible for front end geometry processing and lighting computations, but a number of these functions can be performed by the processor 132 of the host.

Overview of the Image Processing Board

Figure 4A:
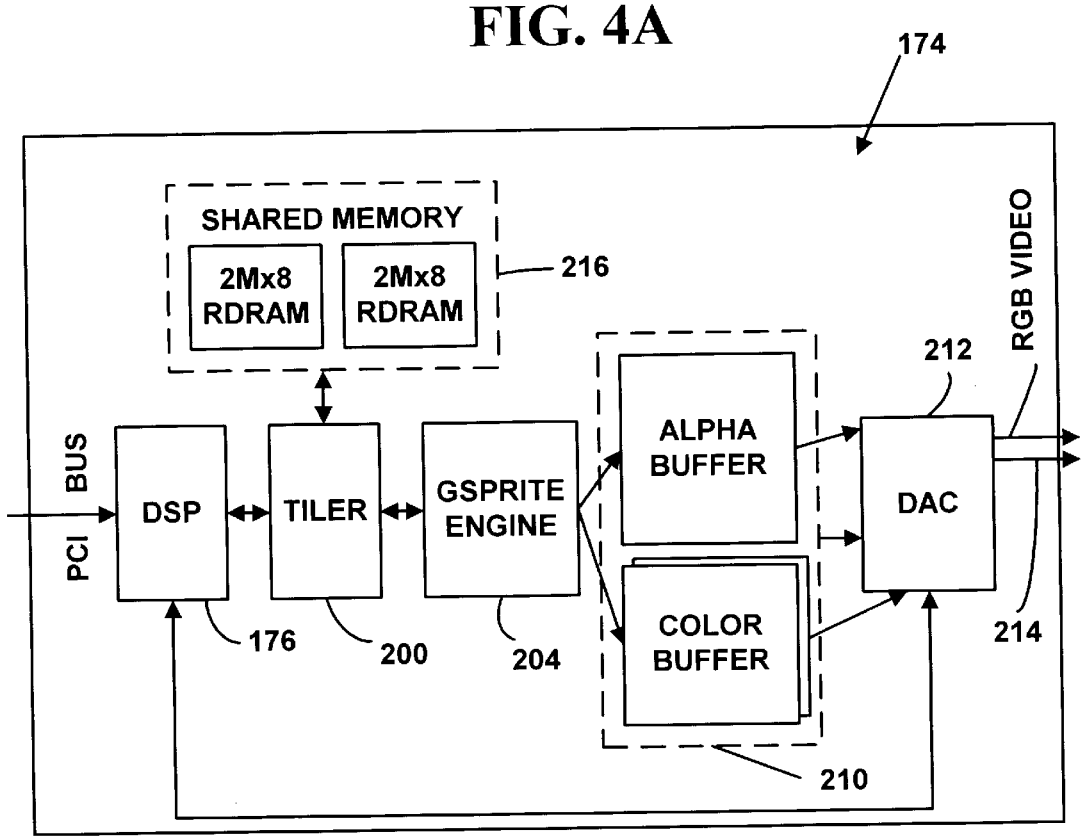
FIG. 4A is a block diagram of image processing hardware for an embodiment.

FIG. 4A is a block diagram illustrating the image processing board 174. The image processing board 174 communicates with the host computer through the bus 146. It includes a DSP 176, tiler 200, shared memory 216, the gsprite engine 204, compositing buffer 210, and a digital-to-analog converter (DAC) 212. The bus 146 (FIG. 2) transfers commands and data between the host and the DSP 176. In response to commands from the host, the image processing board 174 renders images and transfers display images to a display device 142 (FIG. 2) through the DAC 212.

In the embodiment illustrated in FIGS. 2–4A, the host processor and the DSP share the functions of the image preprocessor of FIG. 1. The image processor comprises the tiler 200, gsprite engine 204, compositing buffer 210, and DAC 212. Below, we provide more detail regarding these elements. It should be kept in mind, however, that the implementation of the image processing system can vary.

The shared memory 202 stores image data and image processing commands on the image processing board 174. In one embodiment, the shared memory is used to store gsprite and texture data in compressed form, DSP code and data, and various buffers used to transfer data between processing subsystems.

The DSP 176 is responsible for video compression/decompression and front-end graphics processing (transformations, lighting, etc.). Preferably, the DSP should support floating point and integer computations greater than 1000 MFLOPS/MOPS.

The tiler 200 is a VLSI chip which performs scan-conversion, shading, texturing, hidden-surface removal, anti-aliasing, translucency, shadowing, and blending for multi-pass rendering. The resulting rendered gsprite chunks are then compressed and stored in compressed form in the shared memory. The tiler additionally performs decompression and recompression of gsprite data in support of video and windowing operations.

The gsprite engine 204 operates at video rates to address and decompress the gsprite chunk data and perform the necessary image processing for general affine transformations (which include scaling, translation with subpixel accuracy, rotation, reflection and shearing). After filtering, the resulting pixels (with alpha) are sent to the compositing buffers where display pixel data is calculated.

Gsprite chunk data is processed a number of scan lines at a time for display. In one implementation, chunk data is processed 32 scan lines at a time. The compositing buffer (210) includes two 32 scan line color buffers which are toggled between display and compositing activities. The compositing buffer also includes a 32 scan line alpha buffer which is used to accumulate alpha for each pixel.

The DAC 212 includes a R G B video DAC and corresponding video port 214, to video editing devices. Individual components can be used to implement the functionality of the DAC.

System Operation

Figure 5A:
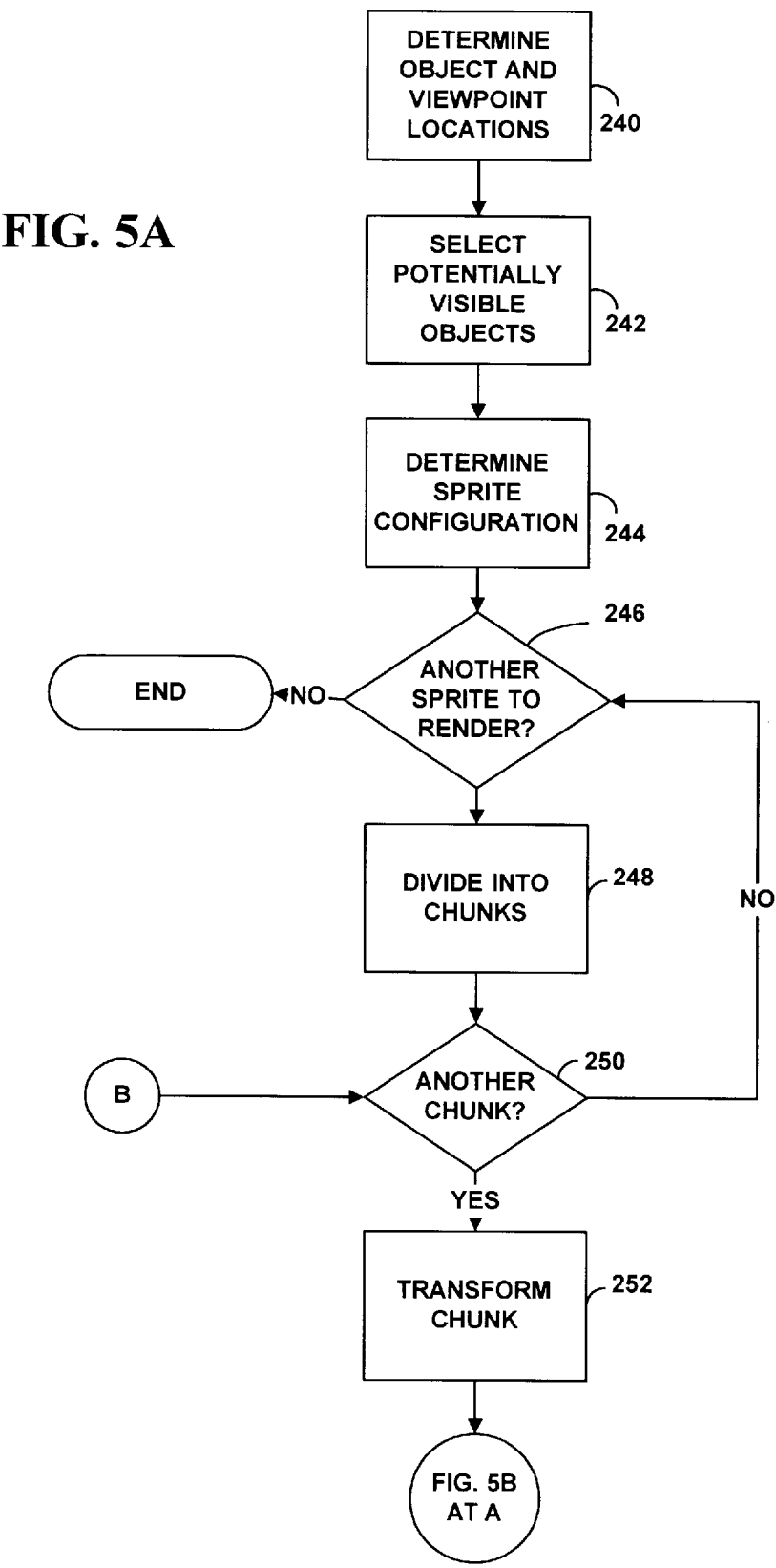
FIGS. 5A and 5B are flow diagrams illustrating an overview of the rendering process in an embodiment.
Figure 5B:
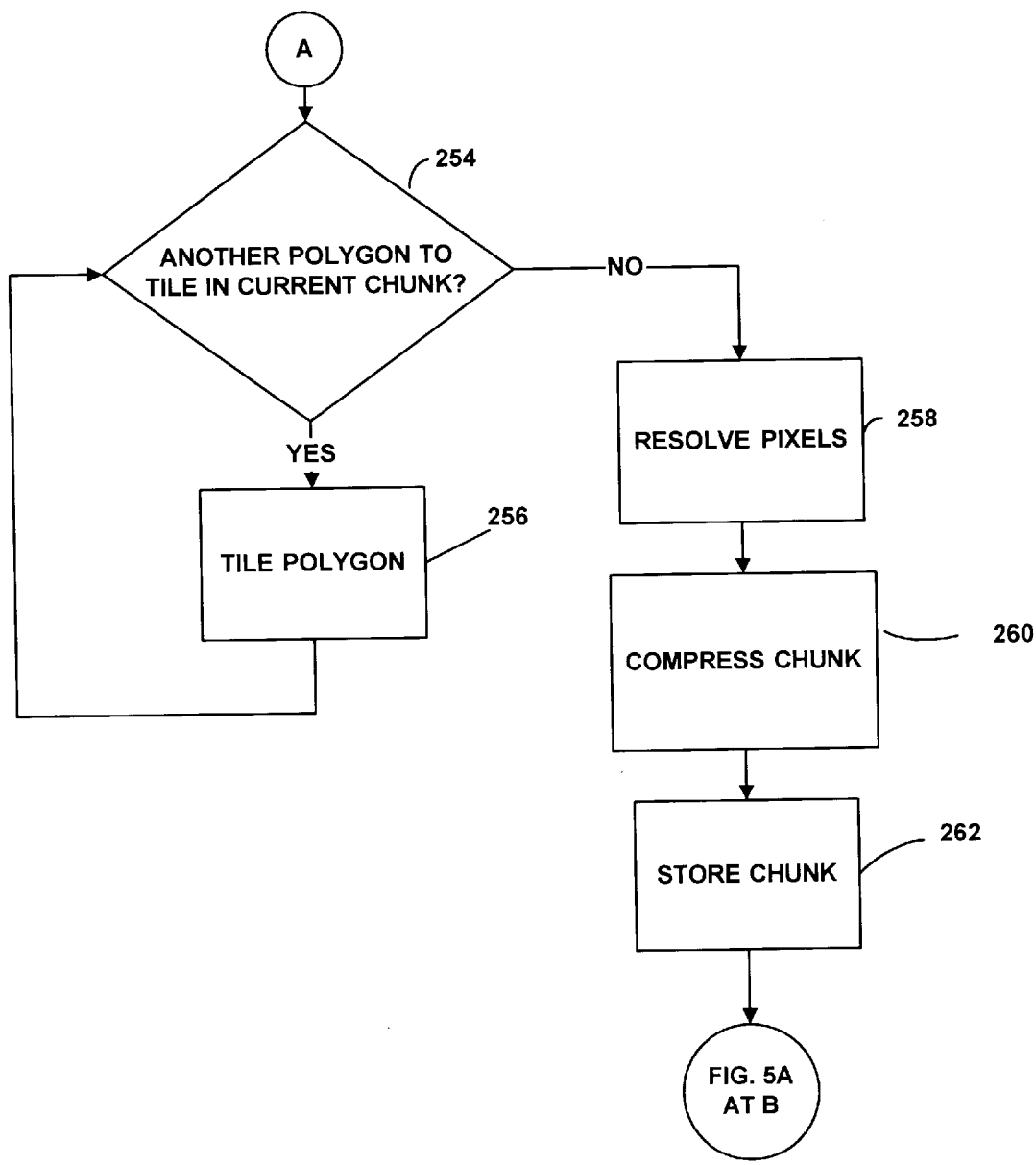

FIGS. 5A and 5B are flow diagrams illustrating steps in rendering an image in the image processing system. Before the image processor 106 begins rendering an image for the view space, the image preprocessor 104 determines object and viewpoint locations (240). In the embodiment illustrated in FIGS. 2 and 3, the graphics support software 160, running in the host computer system 132, determines the object and viewpoint locations from data provided by a graphics application. The graphics application, running on the host processor, defines models representing the relevant objects, and supplies a modeling transform, which is used to place the object with other objects in "world" coordinates.

Next, the image preprocessor 104 selects potentially visible objects (242). It determines potentially visible objects based on the view volume. The view volume is a three-dimensional space in world coordinates that provides the boundaries for a scene. The preprocessor selects potentially visible objects by traversing objects and determining whether their boundaries intersect the view volume. Objects that intersect the view volume are potentially visible in the geometric or spatial sense.

In some cases, it is useful to determine "temporally" potentially visible objects outside the current view volume, to account for future changes in the scene. This enables the system to adjust for rapid changes in the view volume. In typical 3-D graphics systems, the only way to respond to this rapid change is to completely generate a new scene based on the changed input, interposing significant transport delay. Such a long delay has negative effects on the user, creating problems such as over-control and nausea. To reduce this delay, the image preprocessor of the present invention can calculate the location of objects positioned in an extended range outside the visible range, and the image processor can render and store images within this extended range. Using the affine transform capability of the system, viewpoint input for a subsequent frame can be used to reposition the gsprites from this extended range reducing system transport delay to less than 2 computational frames. Such a short transport delay is unachievable with current 3-D graphics hardware systems known to the inventors, and will enable much higher quality simulations with much better user immersion.

The image preprocessor determines the configuration of gsprites for the image (244). This step involves finding how to map potentially visible objects to gsprites. As part of this process, the image preprocessor 104 allocates gsprites, which includes creating a gsprite data structure to store image data corresponding to one or more potentially visible objects. If processing resources allow, each non-interpenetrating object in the scene is assigned to an independent gsprite. Interpenetrating or self-occluding objects may be processed as a single gsprite.

The image preprocessor 104 can aggregate gsprites when the image processor does not have the capacity to composite the gsprites at the desired computational frame rate or there is insufficient system memory to store the gsprites. Rendering to separate gsprites will always be more computationally efficient, so if the system has the memory and compositing capacity, non-intersecting objects should be rendered into separate gsprites. If the system is incapable of storing or generating a display image based on a current assignment of gsprites, some gsprites can be aggregated to alleviate this problem.

After an object or objects are assigned to gsprites, the image processor divides the gsprites into image regions called "chunks" (248). The image preprocessor loops on gsprites and divides the gsprites into chunks (246, 248). In one embodiment, this process includes transforming bounding volumes of objects to the view space and finding rectangular image regions that enclose the transformed bounding volumes. These image regions define the dimensions of the gsprite in terms of the two-dimensional space to which the gsprite's object or objects are rendered. The gsprite is divided into chunks by dividing the rectangular image region into chunks and associating these chunks with the gsprite data structure.

As an optimization, the transformed bounding volume can be scaled and/or rotated so that the number of chunks required to render the gsprite is minimized. Because of this added transformation (scaling or rotating), the space to which the objects assigned to the gsprite are rendered is not necessarily screen space. This space is referred to as gsprite space. In the process of generating a display image, the gsprite should be transformed back to screen space.

The next step is determine how to divide the object geometry among the chunks (250). The image preprocessor determines how the geometric primitives (e.g. polygons) should be divided among the chunks by transforms the polygons to 2-D space (252) and determining which chunk or chunks the polygons project into. Due to the expense of clipping polygons, the preferred approach is to not clip the polygons lying at the edge of a chunk. Instead, a chunk includes polygons that overlap its edge. If a polygon extends over the border of two chunks, for example, in this approach the vertices of the polygon are included in each chunk.

The image preprocessor then queues the chunk data for tiling. Tiling refers to the process of determining pixel values such as color and alpha for pixel locations covered or partially covered by one or more polygons.

Decision step (254) (FIG. 5B) and the step (256) following it represents the process of tiling the polygons within the chunk. While the image processor has included polygons that overlap the boundaries of the current chunk, it only produces pixels that lie within the chunk. The produced pixels include information for anti-aliasing (fragment records), which are stored until all pixels have been generated.

After completing the tiling of polygons in a chunk, the image processor resolves the anti-aliasing data (such as fragment records) for the pixels (258). In one embodiment, the tiler 200 uses double buffering to resolve a previous chunk while the next is tiled. Alternatively, the tiler can use a common buffer with a free list. The free list represents free memory in the common buffer that is allocated as new fragment records are generated and added to when fragment records are resolved. A combination of double buffering and common memory can be used as well.

The image processor compresses the resolved chunk using a compression scheme described further below (260). As the image processor resolves a block of pixels, it can compress another block. The image processor stores the compressed chunk in shared memory (262).

Figure 6:
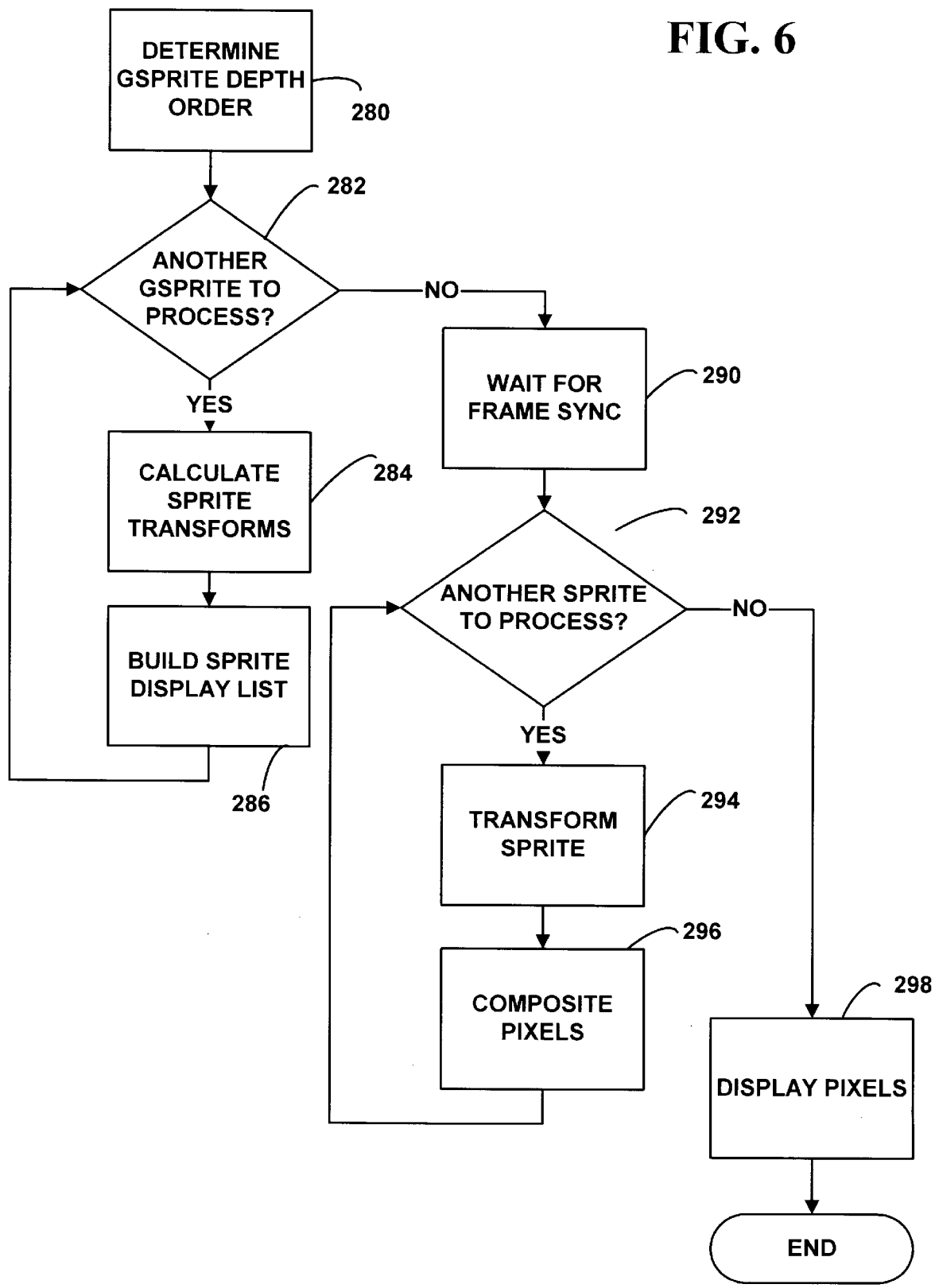
FIG. 6 is a flow diagram illustrating an overview of the display generation process of an embodiment.

FIG. 6 is a flow diagram illustrating the steps executed to display an image. On the image processing board 174 described above, images are read from shared memory 216, transformed to physical output device coordinates by the gsprite engine 204, composited in the compositing buffer 210, transferred to the DAC 212, and then transferred to an output device.

During the display process, the image processor accesses a list of gsprites to be displayed for the current frame. In the process of determining the gsprite configuration, the image preprocessor determines the depth order of gsprites (280). As noted above, one object is preferably assigned to a gsprite. However, the image preprocessor can assign more than one object to a gsprite, for example, to accommodate processing constraints of a particular image processor being used in the system. The image preprocessor sorts objects in Z-order, i.e. in distance from the viewpoint. In addition to sorting objects, it sorts gsprites in depth order as well and stores this depth data in the gsprite data structures.

The decision step (282) in FIG. 6 represents a loop on gsprites in the display process. The steps within this loop can include 1) calculating a transform for a rendered gsprite; and 2) building a gsprite display list to control how gsprites are displayed. These steps are described below.

For gsprites in the potentially visible range, the image processor calculates gsprite transforms. A gsprite transform refers to a transformation on a rendered 2-D gsprite. In one embodiment, the image processor can perform a transformation on a gsprite to reduce rendering overhead. Rather than rendering each object for every frame, the image processor reduces rendering overhead by re-using a rendered gsprite.

It is not necessary to compute a gsprite transform for every frame of image data. For instance, if a gsprite is rendered for the current frame of image data, it may not need to be transformed, unless e.g. the gsprite has been transformed to better match the bounding box for the object. In addition, some gsprites may not need to be re-rendered or transformed because the object or objects assigned to them have not changed and are not moving. As such, the step of transforming a gsprite is optional.

The gsprite may be multiplied by the unity matrix in cases where the position of the gsprite has not changed. This may apply, for example, in cases where the image processor has rendered the gsprite for the current frame, or where the gsprite position has not changed since it was originally rendered.

To specify how gsprites are to be displayed, the image processor creates a gsprite display list. The display list refers to a list or lists that define which gsprites are to be displayed on the display screen. This concept of display list can also apply to other output devices for presenting a frame of image data. The image processor uses the display list in mapping and compositing rendered gsprites to the physical device coordinates. While the step of building the display list is illustrated as part of a loop on gsprites, it is not necessary that the list or lists be generated specifically within this loop.

The display list can refer to a list of gsprites or a list of gsprites per band. A "band" is a horizontal scanline region of a display screen. For instance, in one embodiment a band is 32 scanlines high by 1344 pixels wide. The display list can include a separate list of gsprites for each band, in which case the band lists describe the gsprites impinging on the respective bands. Alternatively, the display list can be comprised of a single list implemented by tagging gsprites to identify which bands the gsprites impinge upon.

The display list in the illustrated embodiment is double-buffered. Double buffering enables the system to generate one display list while it reads another. As the system calculates the gsprite transforms and build the display list for one frame, it reads the display list for another frame and displays the image data in this list.

Because of the double buffering, the steps shown in FIG. 6 are over-lapped: the image preprocessor performs steps (280–286) for one frame while the image processor performs steps (290–298) for another frame.

Figure 7:
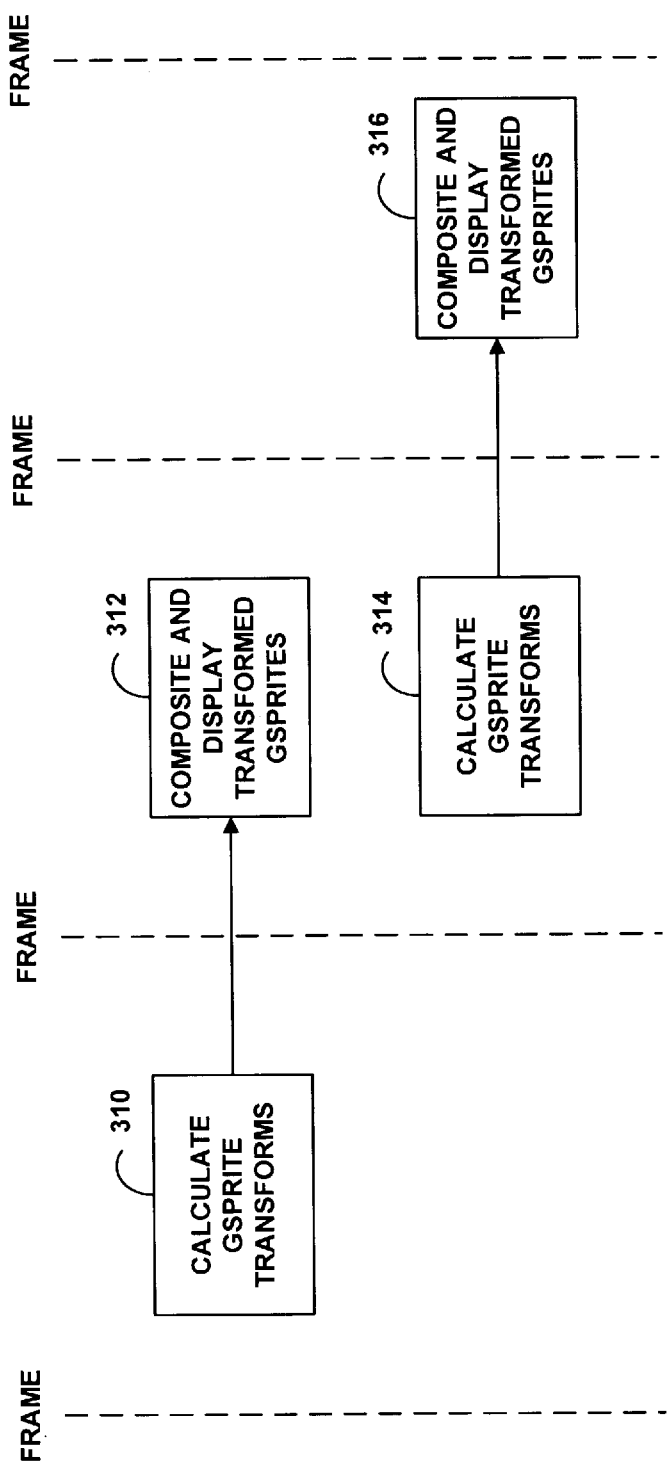
FIG. 7 is a diagram illustrating one aspect of display generation in terms of frame periods in an embodiment.

FIG. 7 is a block diagram illustrating the timing of these steps. After the system completes steps (280–286) (FIG. 6) for a frame 310, it waits for a frame sync signal (vertical retrace) and then performs the buffer swap. The display list it has just created is then used to determine the gsprites to be displayed in the current frame 312. While that display list is processed 312, gsprite transforms are computed and a display list is constructed for a next frame 314. In the next frame, the gsprite transforms and display list that were generated in the previous frame 314 are then used to generate the display image 316.

The image processor converts gsprites to output device coordinates based on the list of gsprites in the display list. The image processor reads gsprite data from shared memory, including color, alpha, and data identifying the gsprite's position. Based on this data, the image processor determines the color and alpha for pixels covered by the gsprite.

In one embodiment, the image processor loops on each band, transforming gsprites that impinge upon that band according to the gsprite display list. We will describe this display process in more detail below.

After transforming gsprite data, the image processor composites the resulting pixel data. This includes computing the color and alpha for pixels in output device coordinates based on the gsprite transforms. The image processor transforms the pixel data for gsprites in the display list and then composites the transformed pixel data. The process involves determining the color and alpha at a pixel location based on the contribution of one or more pixel values from gsprites that cover that pixel location.

In one embodiment, the image processor loops on bands and composites pixel data for each band. The image processor double buffers pixel data: it transforms and composites gsprite data for a band in one buffer while it displays composited pixel data for another band.

After compositing pixel data, the image processor then transfers composited pixel data to an output device. The most typical output device used in connection with this system is, of course, a display. To display the pixel data, it is converted to a format compatible with the display.

Having described system operation of an embodiment, we now provide more detail regarding the image processing board.

The Image Processing Board

In the one embodiment, the shared memory 216 comprises 4 Mbytes of RAM. It is implemented using two 8-bit Ram bus channels. The amount and type of memory can vary, however.

Figure 8:
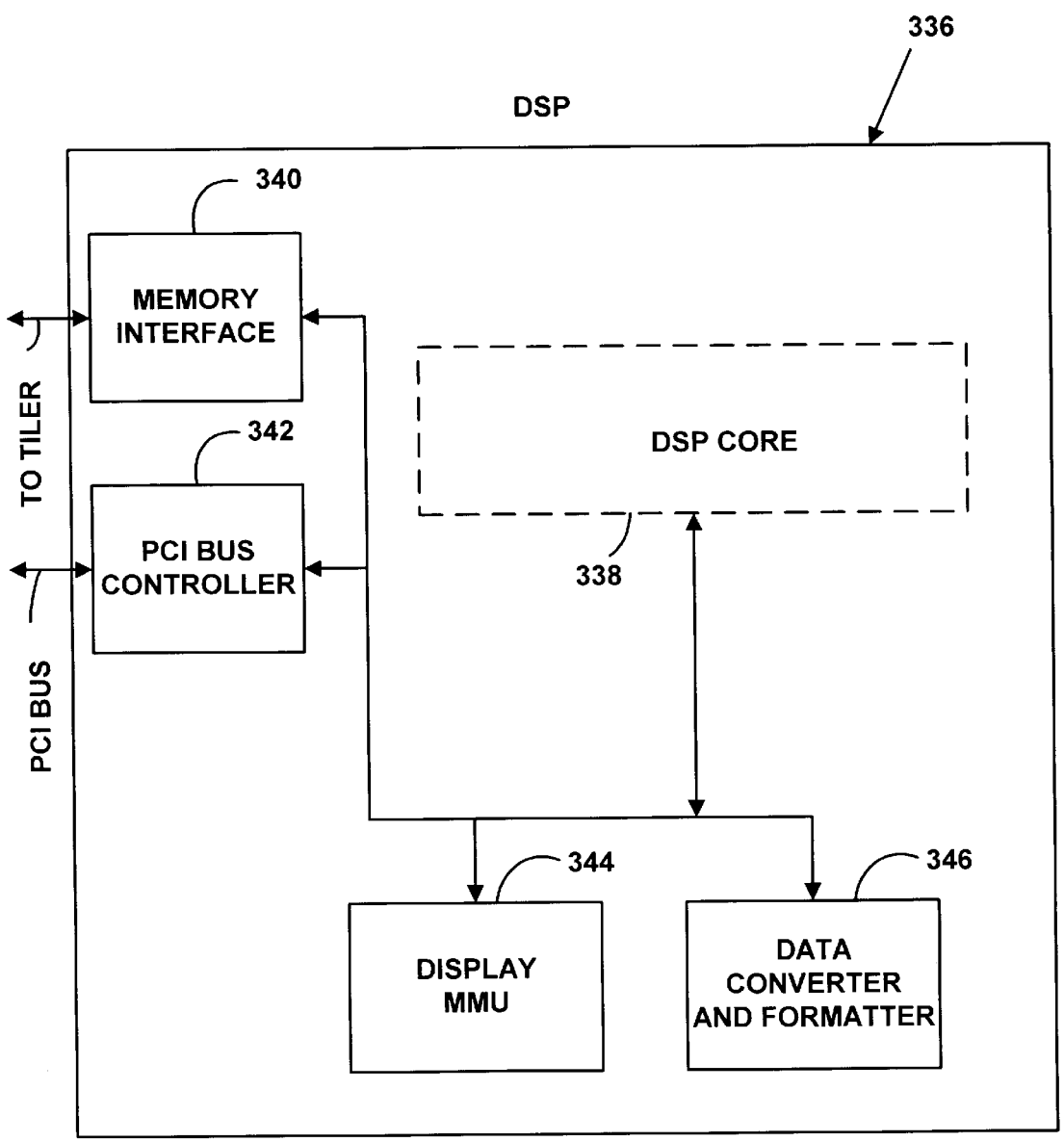
FIG. 8 is a block diagram of a Digital Signal Processor (DSP) in an embodiment.

FIG. 8 is a block diagram illustrating the DSP 336 on the image processing board 174. The DSP 336 is responsible for parsing the command stream from the host processor and performing some video processing, and front end geometry processing. The DSP performs front end geometry and lighting calculations used for 3-D graphics. This includes model and viewing transformations, clipping, and lighting. Portions of the gsprite animation management are also handled in the DSP such as gsprite motion extrapolation.

Rendering commands are stored in main memory buffers and DMAed to the image processing board 174 over the PCI bus and through the PCI bus controller 342. These commands are then buffered in the shared memory 216 on the board until needed by the DSP 336 (FIG. 8).

The DSP core 338 includes a processor for performing the image processing computations described above. In addition the DSP core performs scheduling, and resource management.

The Memory interface 340 supports high speed data transfers, e.g. 64 bits at 80 MHz It is designed to interface with conventional DRAM and SDRAM devices. The tiler 200 is designed to directly connect to this bus, simulating the memory timing required by the DSP.

The data formatter and converter 346 in the DSP formats rendering instructions for the tiler. This block converts floating point color components into integer and packs them into the tiler specific data structures. It also buffers up a complete command and DMAs it directly to a memory buffer in shared memory. These rendering instructions are later read by the tiler when it is ready to perform the operations.

Among its formatting tasks, the data formatter and converter 346 formats triangle command data for the tiler. R G B ∝ (alpha) data which is calculated by the DSP (336) in floating point is converted to 8 bit integer. Coordinate information is converted from floating point to 12.4 fixed point. The data is packed into 64 bit words and transferred in a contiguous block to the shared memory to optimize bandwidth.

The display memory management unit (MMU) 344 is used for desktop display memory. It traps PCI accesses within a linear address range that is allocated as the desktop display memory. It then maps these accesses to image blocks stored in shared memory.

The architecture of the image processing board (FIG. 4A, 174) is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance.

Figure 9A:
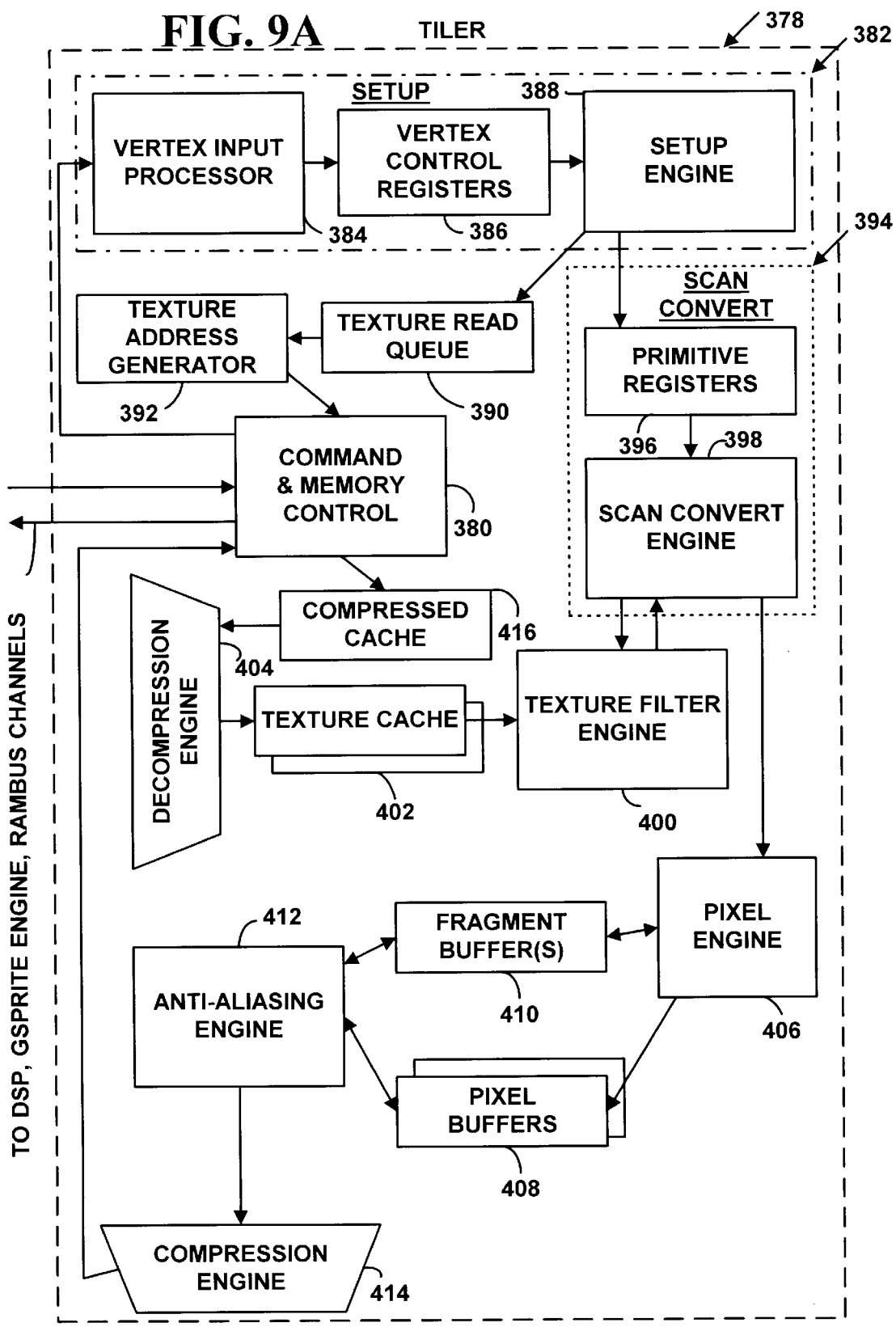
FIGS. 9A–C are block diagrams illustrating alternative embodiments of a tiler.

FIG. 9A is a block diagram of the tiler 200 on the image processing board 174. The tiler is responsible for 2-D and 3-D graphics acceleration, and for shared memory control. As shown in the block diagram of the image procession board, the tiler connects directly to the DSP (176, FIG. 4), the gsprite engine 204, and the shared memory system 216.

The functional blocks shown in the block diagram above are described in this section.

The tiler 378 includes a number of components for primitive rendering. The command and memory control 380 includes an interface to shared memory 216, the gsprite engine 204, and the DSP 176. Accesses to memory from the tiler, DSP, and gsprite engine are arbitrated by this block. A queue is provided to buffer read accesses.

The setup block 382 calculates the linear equations which determine the edge, color, and texture coordinate interpolation across the surface of the triangle. These equations are also used to determine which texture blocks will be required to render the triangle. The edge equations are also passed to the scan conversion block 394 and are stored in the primitive registers 396 until required by the scan convert engine 398.

The setup block 382 includes three components: the vertex input processor 384, vertex and control registers 386, and the setup engine 388. The vertex input processor 384 parses the command stream from the DSP. The vertex and control registers 386 store the information necessary for processing polygons or other geometric primitives. Triangle processing is used in this specific embodiment, and the tiler 200 includes registers for six vertices (three for each triangle) to allow double buffering of triangle processing. The setup engine 388 calculates the differentials for color, depth, edges, and texture coordinate interpolation across the surface of the triangle. These equations are also used to determine which texture blocks are used to render the triangle. The setup engine also pre-fetches texture chunks so that they are available when needed by the scan convert engine 398.

The setup engine 388 also communicates with the texture read queue 390, and a texture address generator 392. The texture read queue 390 buffers read requests for texture blocks from shared memory. While we use the term "texture" in referring to the portions of the tiler used to retrieve image data blocks from memory, it should be understood that this term can refer to texture maps, shadow maps, and other image data used in multi-pass rendering operations. The texture address generator 392 determines the address in memory of the requested chunks and sends texture read requests to the command and memory control 380. The texture address generator 392 includes a memory management unit that controls the writing of image data to the texture cache.

The scan convert block 394 receives differentials and other vertex data from the setup block and generates pixel data. The scan convert block 394 includes primitive registers 396, and the scan convert engine 398. The primitive registers 396 store the equation parameters for each triangle parameter. The primitive registers include registers to store multiple sets of equations so that the scan convert engine does not stall waiting for texture data.

The scan convert engine 398 scan converts polygons, which in this case are triangles. The scan convert block 394 includes the interpolators for walking edges and evaluating colors, depths, etc. The pixel address along with color and depth, and anti-aliasing coverage information is passed to the pixel engine for processing.

The scan convert engine 398 passes texture addresses to the texture filter engine 400, which calculates the texture data. The texture filter engine 400 calculates pixel color and alpha data for polygons that are being rendered. The illustrated texture filter engine computes a filter kernel based on the Z-slope and orientation of the triangle being rendered, and on the center of the texture request (the S and T coordinates of a point mapped into the texture). Filtering is performed in two passes in a pipelined fashion so that a new pixel is generated every cycle. The filter kernel can be an anisotropic filter or an isotropic filter. Where anisotropy is not required, the filter kernel can use negative lobes allowing much sharper textures than is possible with tri-linear interpolation. The texture filter engine 400 also handles Z-comparison operations for computing effects on shadows.

The texture cache 402 stores blocks of decompressed image data. In one implementation, the texture cache 402 stores texture data for sixteen 8×8 pixel blocks. The data is organized so that 16 texture elements can be accessed every clock cycle.

The decompression engine 404 decompresses texture data and transfers it to the texture cache 402. In this embodiment, the decompression engine includes two decompressors, one which implements a discrete cosine transformation (DCT) based algorithm for continuous tone images such as textures, and the other which implements a lossless algorithm for desktop pixel data. The DCT based algorithm is implemented by two parallel decompression blocks, each of which can generate eight pixel elements (i.e. two pixels) per clock cycle.

The compressed cache 416 can be used to buffer compressed data before the decompression engine 404 decompresses and transfers it to the texture cache 402.

The scan convert engine 398 transfers pixel data to the pixel engine 406. The pixel engine 406 performs pixel level calculations including blending, and depth buffering. The pixel engine also handles Z-comparison operations required for shadows. To achieve optimal performance, the pixel engine should preferably operate at one pixel per clock cycle.

The pixel engine 406 controls transfers of pixel data to a rasterization buffer. The rasterization buffer includes pixel buffers 408, and fragment buffers 410 in the illustrated embodiment. The pixel buffers 408 include two buffers to support double buffering. In this implementation of the pixel buffers, each pixel entry stores eight bits per color component (R G B), eight bits for the alpha component, 24 bits for the Z-buffer, 8 bits for the stencil buffer, and a nine bit pointer into the fragment buffer. This is a total of 73 bits per pixel. One pixel buffer is used by the pixel engine 406 while the other is used by the anti-aliasing engine 412. The buffers are then swapped.

The fragment buffers 410 store fragments for partially covered pixels called pixel fragments, which result from pixels of polygons whose edges cross a given pixel, or are translucent. The fragment buffer is single buffered in the implementation shown in FIG. 9A. A free list of fragments is maintained, such that as fragments are resolved, they are added to the free list, and as fragments are generated, they use entries from the free list. Alternatively, the fragment buffer could be double buffered, so that one fragment buffer could be resolved by the anti-aliasing engine while the other was filled by the pixel engine in parallel.

In one embodiment, a fragment record includes the same data as in the pixel buffer entries plus a 4×4 mask. The nine bit pointer is used to form a linked list of entries, with a reserved value indicating the end of the list. In this embodiment, the fragment buffers 410 includes a total of 512 entries, but the size can vary.

The anti-aliasing engine 412 calculates the color and alpha component for pixels which are affected by more than one polygon, which occurs when polygons only partially cover the pixel area (i.e. the polygon edges cross the pixel) or when polygons have translucency. The anti-aliasing engine 412 transfers resolved pixel data to the compression engine 414. In this embodiment, the compression engine 414 includes two compressors, one DCT based for continuous tone images, and one lossless for desktop pixel data. The DCT based algorithm is implemented using a compressor capable of compressing eight pixel elements per clock cycle. The compression engine 414 compresses the resulting rendered gsprites and sends the compressed data to the command memory and control 380 for storage in shared memory 216 (FIG. 4). The tiler also has a compressed cache 416 for caching compressed data.

Figure 10:
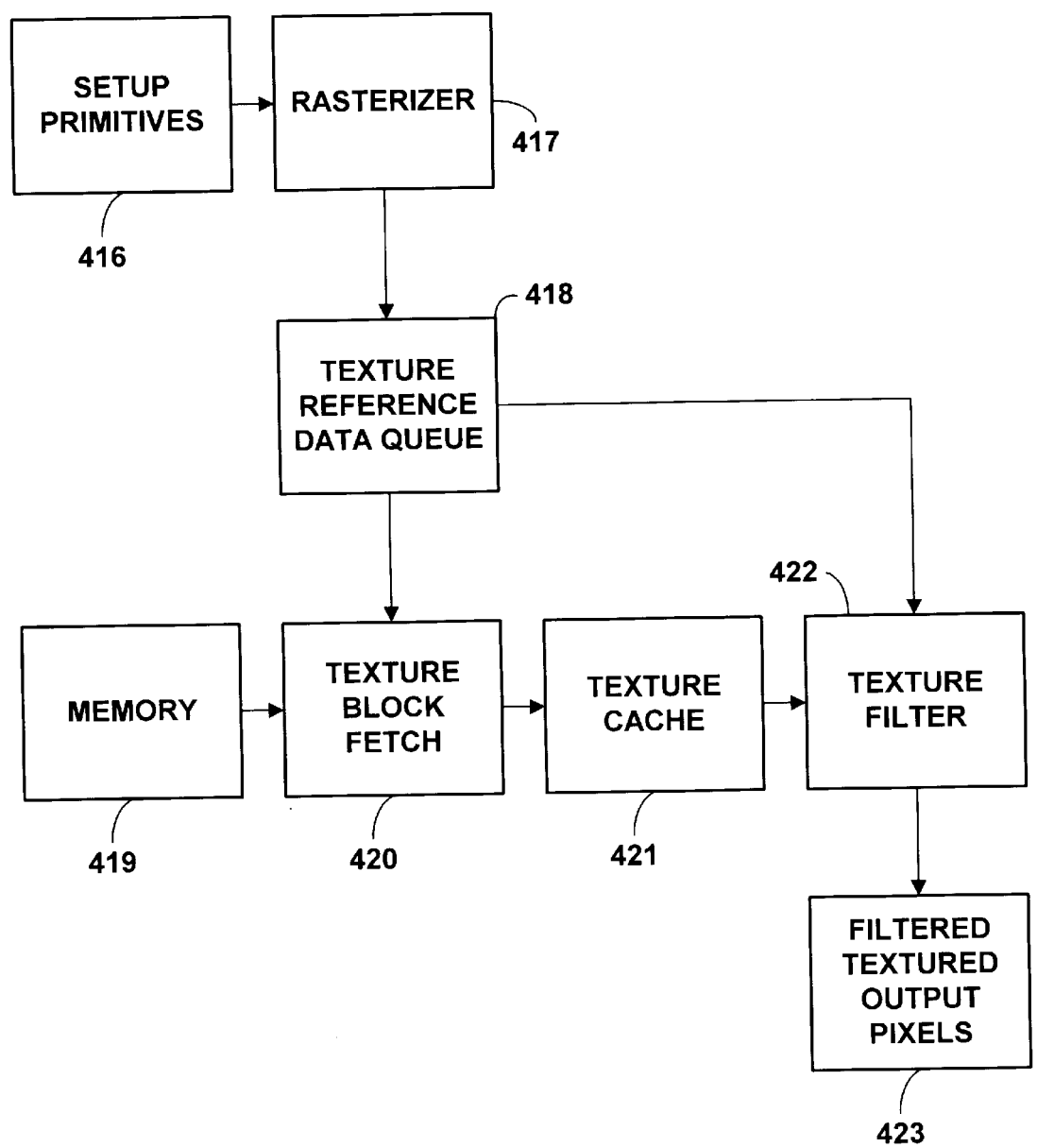
FIG. 10 is a block diagram illustrating a system for accessing texture data from memory.
Figure 11:
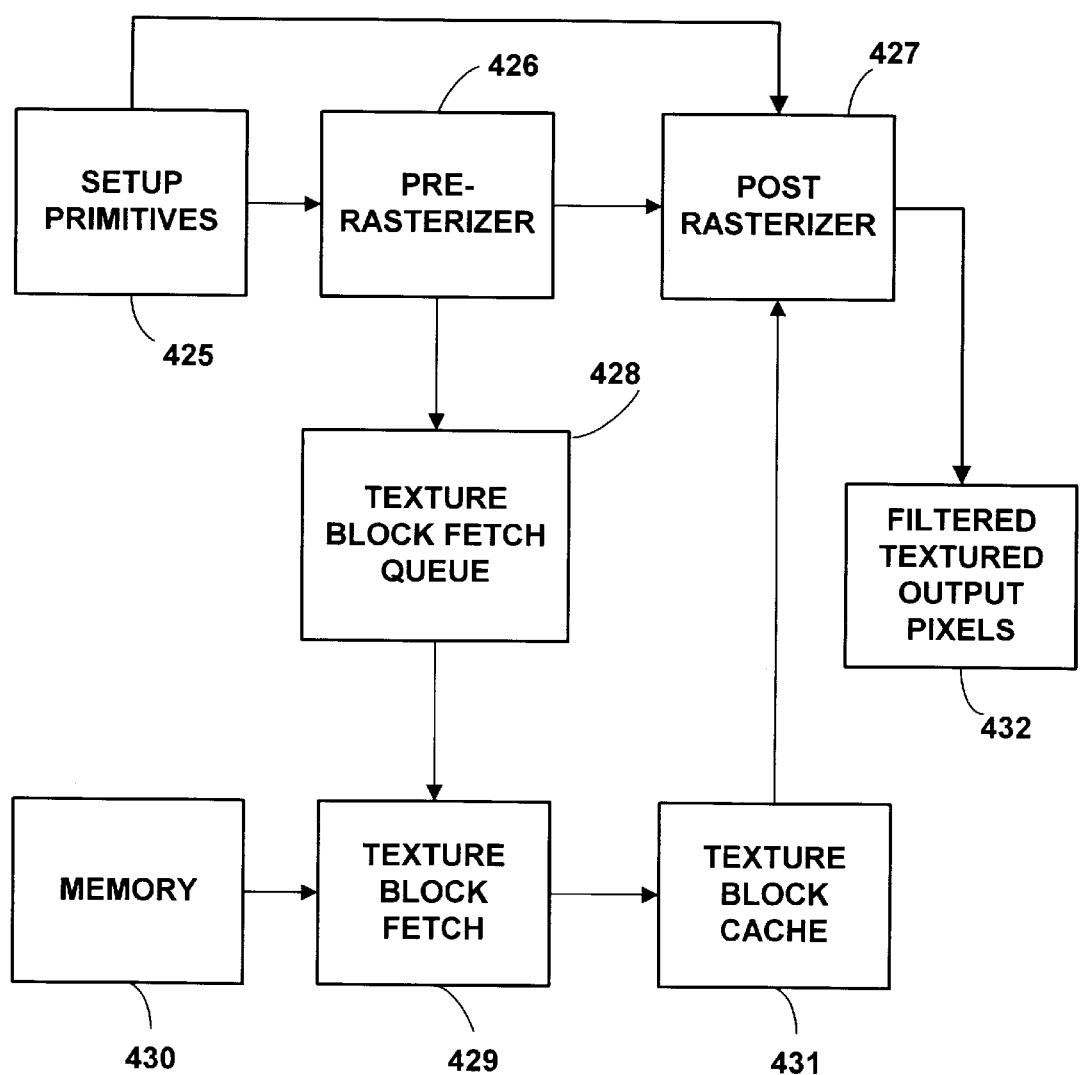
FIG. 11 is a block diagram illustrating a system for accessing texture data from memory.

FIGS. 10 and 11 illustrate two alternative implementations for accessing image data from memory during the pixel generation process. There are a number of instances when image data has to be accessed from memory during pixel generation. These include for example, accessing a texture map during a texture mapping operation, accessing a shadow map during a shadowing operation, and accessing color and/or alpha data during multi-pass blending operations. For simplicity, we refer to the image data in memory as "textures" or "texture data". However, it should be understood that the methods and systems described here can also be applied to other types of image data accessed from memory during pixel generation.

The implementations illustrated in FIGS. 10 and 11 provide alternative approaches to efficiently load and utilize a texture cache on the tiler. A significant advantage of these approaches is that texture data can be stored in memories with high latency and even in a compressed format without unduly hampering performance. As a result, less specialized and lower cost memory can be used to implement high performance rendering hardware.

Texture data from the memory is accessed and cached in units called "blocks" which are typically a small rectangular region appropriate for efficient fetching and catching. A typical block size is about 8×8 samples in size. For instance, for texture maps, a typical block is 8×8 texels.

FIG. 10 is a functional block diagram illustrating one embodiment for accessing these blocks of texture data. This embodiment solves the latency problem by buffering pixel data from the rasterizer 417, including texture data requests, in a texture reference data queue 418. The queue includes enough entries to absorb the latency which would otherwise be incurred in accessing (and possibly decompressing) a texture block so that the rendering process can run at full speed. For example, if it takes 100 cycles to fetch a texture block, and the tiler is capable of producing one pixel per clock cycle, then the texture reference data queue includes at least 100 entries.

Data flow in the system illustrated in FIG. 10 proceeds as follows. First, geometric primitives are set-up for rasterization as shown in block 416. Set-up processing includes, for example, reading vertices for a geometric primitive such as a triangle, and calculating the differentials for color, depth, and edges across the surface of the triangle. The parameters resulting from these computations are then fed to the rasterizer 417.

The rasterizer 417 reads the equation parameter data for each primitive and generates pixel data. The rasterizer generates pixel data, including texture coordinates and filter data, and buffers this data in the texture reference data queue 418. The texture fetch block 420 reads texture reference data stored in the queue 418 and fetches the appropriate texture blocks from memory 419.

The pixel data stored in the texture reference data queue 418 in this implementation includes: an address of destination for the pixel (X, Y) being computed; depth data (Z); a coverage mask; color and translucency data; the coordinates of the center for the texture request (S, T), and texture filter data. The depth and coverage data is only needed in the texture reference data queue if high-quality anti-aliasing of pixels is desired. Alternatively, hidden surface removal and anti-aliasing can be performed in the rasterizer 417. If hidden surface removal and anti-aliasing are performed in the rasterizer, depth data and coverage data does not need to be stored in the data queue 418. The texture filter data may include a level of detail parameter for MIP-mapping, for example, or may include anisotropic filter data for higher quality texture filtering.

The texture block fetch 420 reads the texture reference data buffered in the data queue and retrieves the corresponding texture data from memory 419. In the case of texture map accesses, the texture block fetch unit converts the (S, T) center of the texture request and the texture filter data into the addresses of the blocks required to satisfy the texture filtering operation. The blocks identified in this process are then fetched into the cache, replacing other blocks as needed. Image data blocks can be fetched using other suitable cache (LRU) or other suitable cache replacement algorithm. To reduce memory accesses, the texture block fetch unit keeps track of the texture blocks already stored in the texture cache 421 and avoids requesting the same block more than once. This capability significantly reduces the memory bandwidth required to perform high quality texture filtering because the latency in retrieving a texture block is incurred only once in computing an image.

The texture block fetch unit includes a hold-off mechanism to prevent from overwriting texture blocks still needed in the texture filter unit in the tiler. One way to implement such a hold-off mechanism is to associate a reference count with each texture block to keep track of whether the texture filter has used a particular texture block. This reference count is incremented on receipt of a texture request to a block by the texture fetch unit, and decremented in response to its use by the texture filter unit. The texture block fetch unit then only replaces blocks that have a corresponding reference count of zero.

An alternative way to implement the hold-off mechanism is to allocate a buffer for temporary storage of texture blocks output by the texture fetch unit. In this approach, the image block is first written to temporary storage buffer. After the texture fetch unit has completed writing the image block to the temporary storage buffer, it can then be transferred to the texture cache. Image blocks are swapped to the texture cache when first needed by the texture filter unit 422.

In the case of texture mapping operations, the texture filter block 422 reads texture samples from the texture cache 421 and the pixel data stored in the texture reference data queue 418, and computes pixel color and possibly alpha values from the texture sample data.

In addition to texture mapping operations, this approach can also be applied to shadowing and multi-pass blending operations as well. For instance, texture reference data queue can be used to retrieve a shadow depth map residing in memory. Alternatively, the texture reference data queue can be used to retrieve color and/or alpha data used in multi-pass lighting and shading operations. More detail regarding texture mapping, shadowing, and multi-pass operations is provided below.

There are a number of advantages to buffering pixel data in the manner described above. One significant advantage is that the image data can be stored in less specialized memory (with higher access time), which reduces the cost of the overall system. In addition, image data including textures can be stored in compressed format and can still be accessed at fast enough rates to perform sophisticated pixel operation such as texture filtering. As a result, the system is able to achieve improved performance at a lower cost relative to known methods for accessing texture data.

Another advantage to this approach is that the texture reference data queue is able to predict accurately which image blocks need to be accessed from memory. As a result, the system incurs latency for memory accesses no more than necessary. Once the image data blocks are in the texture cache, the texture filter unit can run at the full speed of the rasterizer, as long as there is sufficient memory bandwidth and texture fetch throughput to write the requested image blocks to the texture cache.

Queuing texture references with the texture request center and filtering the data allows the queue to be much smaller than if texels with their corresponding texture filter weights were queued.

FIG. 11 is a functional block diagram illustrating an alternative embodiment for accessing image data from memory. In this approach, geometric primitives are queued and then processed in a pre-rasterizer to hide the latency of the texture block fetch during the pixel generation process. An example will help illustrate the concept. If an average primitive takes 25 cycles to rasterize, and it requires 100 clock cycles to fetch a texture block from memory, the primitive queue should be at least four primitives long. A simplified version of the post-rasterizer, the pre-rasterizer includes circuitry to determine the image data blocks that need to be accessed from memory. Once the texture data is fetched, the post-rasterizer can generate pixel data using texture data without being exposed to the delay involved in fetching blocks from memory.

The data flow through this implementation occurs as follows. As in the implementation described above, geometric primitives are processed in a set-up block 425 for rasterization. In this particular implementation, however, the set-up block 425 includes a larger primitive queue to buffer more primitives. The pre-rasterizer 426 quickly converts the primitives into a list of texture blocks needed to satisfy the texture filtering needs for all of the pixels covered by the primitive in the order that the blocks will be needed by the post-rasterizer 427. The pre-rasterizer is a simplified version of the post-rasterizer 427, or the rasterizer 417 in the alternative implementation. In this approach, the pre-rasterizer only needs to compute texture data addresses and determine texture requests.

The pre-rasterizer also keeps a model of the texture block cache and performs the cache replacement algorithm, such as least recently used (LRU) to keep from exceeding the size of the texture block cache. As part of the cache replacement algorithm, the pre-rasterizer compresses repetitive requests to a single texture block to only one request to the texture block fetch unit 429.

The texture block fetch queue 428 includes entries for storing texture block requests. The texture block fetch unit 429 reads texture requests from the texture block fetch queue and retrieves the appropriate blocks from memory 430.

The post-rasterizer rasterizes primitives queued in the set-up block 425 to generate pixel data for a pixel location. If image data needs to be accessed from memory during the pixel generation process, the post-rasterizer rasterizes the primitives as quickly as the necessary texture blocks can be transferred to the texture block cache 431. When the post-rasterizer completes rasterizing a primitive queued in the set-up block, the primitive is removed and replaced with another primitive from the input data stream. The set-up block is responsible for keeping the queue filled with primitives so that the pre-rasterizer and post-rasterizer are not stalled in the pixel generation process.

Like the alternative embodiment described above, the texture block fetch should preferably include a hold-off mechanism to prevent it from overriding the texture blocks that are still needed by the post-rasterizer. The two hold-off mechanisms described above can also be used in this implementation. Specifically, a reference count can be used to keep track of when an image block has been requested and then used. In this case, the reference account would be incremented on receipt of a texture request for a block by the pre-rasterizer, and decremented upon use by the post-rasterizer. The texture block fetch unit then only replaces blocks in the texture cache when their corresponding reference count is zero.

Alternatively, a buffer can be allocated for temporary storage of texture blocks output by the texture fetch block. When the texture fetch block has completed writing a block to this temporary buffer, it can then be transferred to the texture block cache 431 when requested by the post-rasterizer 427. When the post-rasterizer 427 first request data in a texture block in the temporary buffer, the block is then transferred to the texture block cache 431.

There are a number of advantages to this approach. First, texture data can be stored in less specialized memory and can still be accessed at rates required to support sophisticated texture filtering. An important related advantage is that texture data can be stored in a compressed format and then decompressed for use in the pixel generation process.

Another advantage of this approach is that requests to memory can be predicted so that the latency for memory access is incurred only once for each texture block to render a scene. Once the initial texture blocks are in the texture cache, the post-rasterizer can run at full speed, as long as there is memory bandwidth and texture fetch throughput to keep the cache current.

Figure 9B:
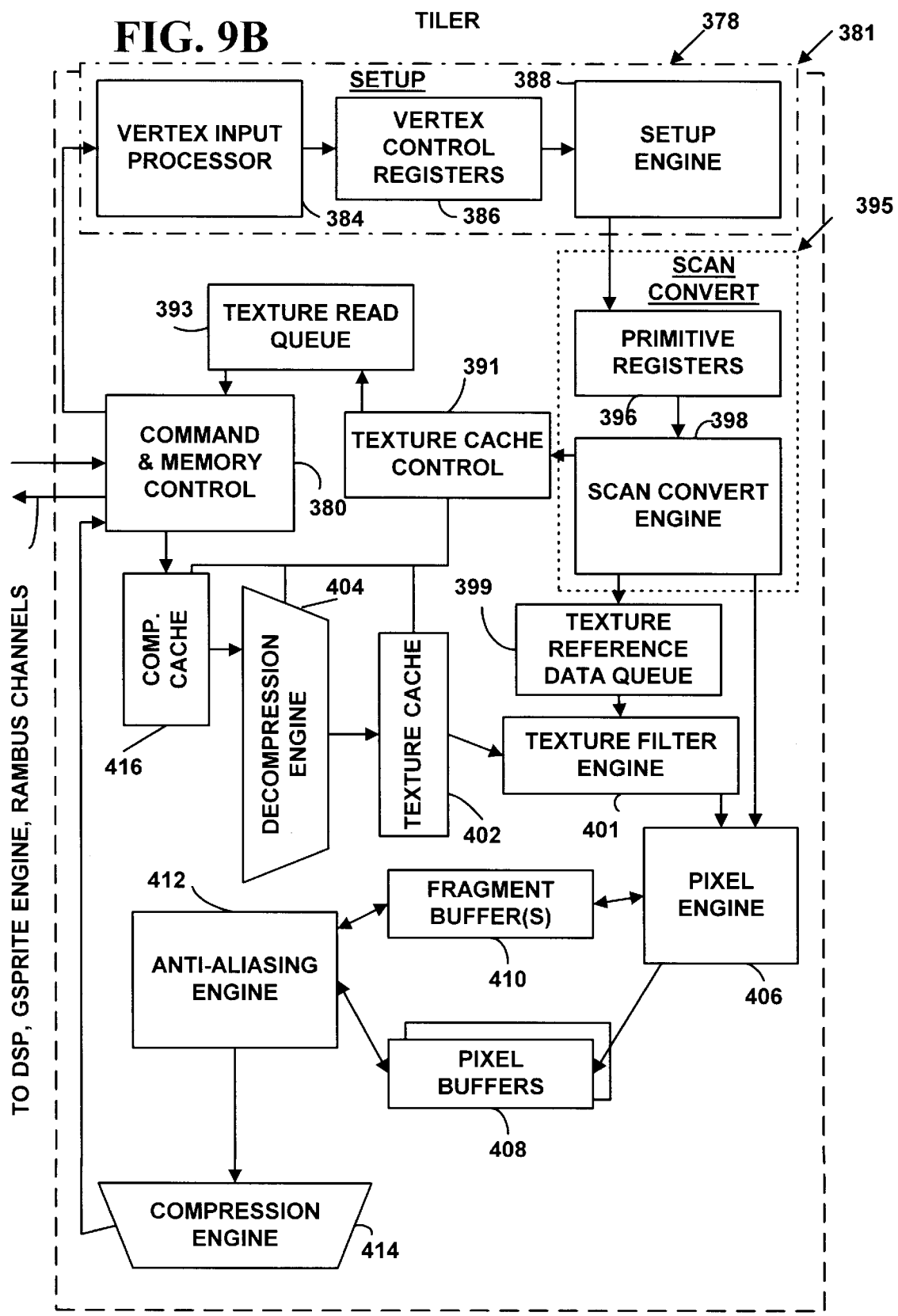

FIG. 9B illustrates a more detailed implementation of the system illustrated in FIG. 10. The set-up block 381 in FIG. 9B corresponds to the set-up block 416 in FIG. 10. Unlike the set-up block 382 of FIG. 9A, the set-up block 381 in this alternative implementation does not generate texture read requests. Instead, the scan convert block 395 generates pixel data, including texture reference data, which is buffered in the texture reference data queue 399.

The scan convert block 395 of FIG. 9B is a specific implementation of the rasterizer 417 in FIG. 10. It computes a Z-value, a coverage mask, color and translucency data, and the center of the texture request in texture coordinates. For some texture mapping operations, it also computes level detail data or anisotropic filter data. The texture filter engine 401 reads the texture request and possibly texture filter data buffered in the texture reference data queue 399 and accesses the appropriate texture samples in the texture cache. From this texture data, the texture filter engine computes the contribution of the texture to the pixel color and alpha values. The texture filter engine combines the color and alpha in the texture reference data queue 399 with the contribution from the texture to generate pixel values sent to the pixel engine 406.

The texture cache control 391, texture read queue 393, command and memory control 380 are specific implementations of the texture block fetch 420 in FIG. 10. In addition, for compressed texture blocks, the compressed cache 416 and the decompression engine 404 are also part of the texture block fetch 420.

Figure 9C:
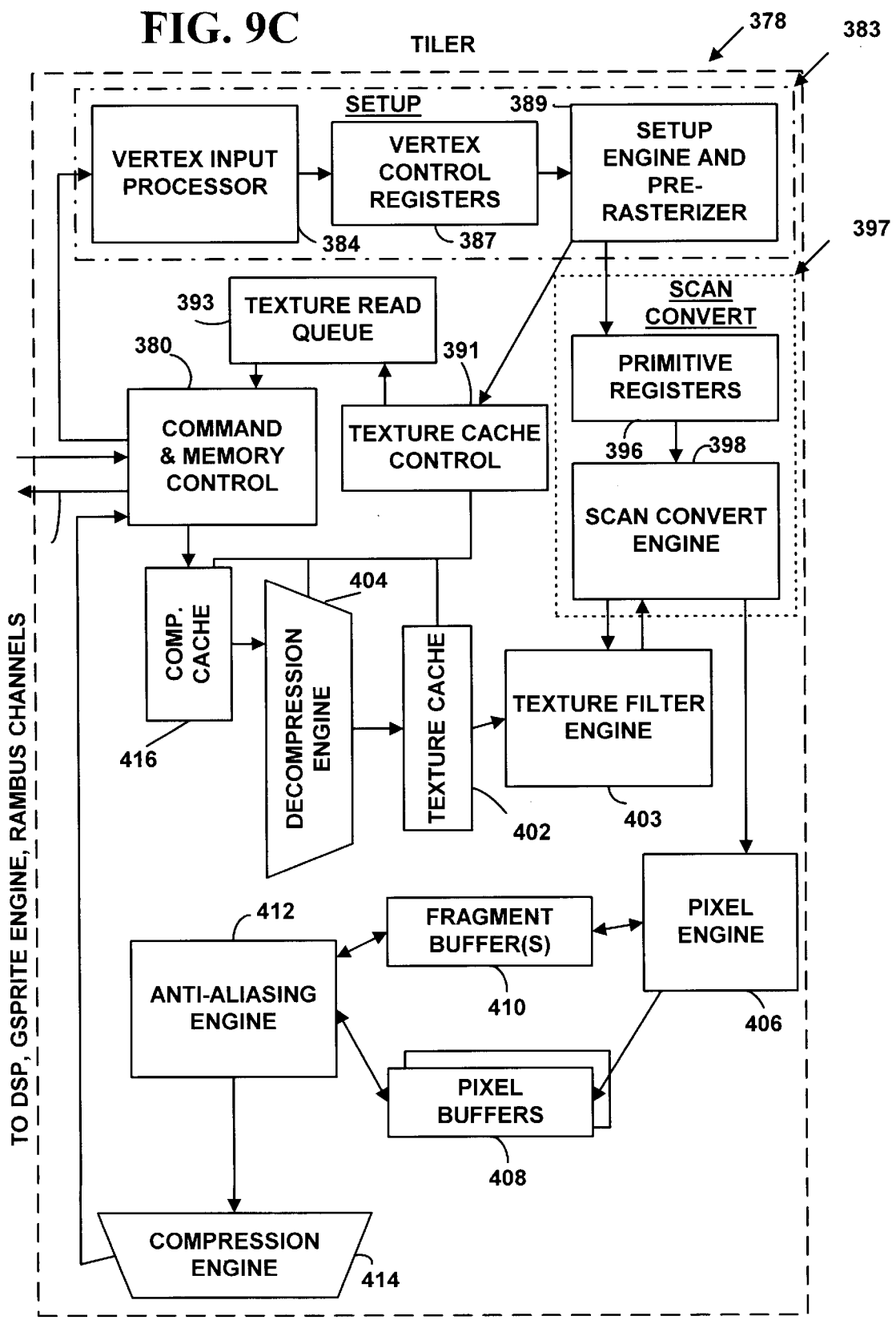

FIG. 9C illustrates a more detailed implementation of the system illustrated in FIG. 11. In this implementation, the functionality described in connection with blocks 425 and 426 of FIG. 11 is implemented within the set-up block 383. Specifically, the set-up block 383 includes the pre-rasterizer 426. The set-up block 383 also includes additional vertex control registers 387 to buffer additional primitives so that the pre-rasterizer can quickly convert the primitives to initiate texture data requests. The set-up engine and pre-rasterizer 383 sends requests for texture blocks to the texture cache control 391 shown in FIG. 9C.

The texture cache control 391 ensures that the required texture blocks will be in the texture cache 402 when needed. The texture read queue buffers read requests for texture data blocks to the shared memory system. The command and memory control 380 arbitrates access to the shared memory system, and it includes a buffer for buffering data from memory. The texture cache control 391, texture read queue 393, and the command and memory control 380 are specific implementations of the texture block fetch 429 in FIG. 11. For compressed texture blocks, the compressed cache 416 and the decompression engine 404 are also part of the texture block fetch 429. The texture cache control 391 manages the flow of texture blocks from the compressed cache 416, through the decompression engine 404, into the texture cache 402.

The scan convert block 397 and the texture filter engine 403 are a specific implementation of the post-rasterizer 427 in FIG. 11. The scan-convert block 397 and the texture filter engine 403 operate similarly to their counterparts illustrated in FIG. 9A and described above.

Texture Cache Control

Above, we described two approaches for rasterizing in environments with high latency for texture fetch operations. We now describe aspects of the texture cache control in more detail.

The texture cache control scheme allows a rasterizer to function at full speed during texture mapping in spite of a high latency for texture map fetch operations. In the tiler, this latency is the result of the time required to read uncompressed texture data from shared memory (e.g., RAMBUS) plus the time required to decompress blocks of the texture map. The scheme also applies to the gsprite engine, which fetches gsprite blocks from shared memory, possibly decompresses them, and converts pixel data in gsprite space to view space (or more specifically, to screen coordinates).

The basic premise of the texture cache control scheme is to produce two identical streams of texel (or gsprite pixel) requests which are offset in time. The first (earlier) stream is a pre-fetch request for which no texture data is returned, while the second (later) stream is an actual request which does return texel data. The time difference between these two streams is used to hide the latency of reading and decompressing texture data.

Two approaches for generating these time-separated requests described above are: (1) duplicate rasterizers which both read from a single primitive FIFO (FIG. 11 and 9C); and (2) a single rasterizer followed by a pixel FIFO (FIG. 10 and 9B).

In approach (1), the first rasterizer peeks at primitives from positions at or near the input side of the primitive FIFO and rasterizes the primitives, making texture requests but not receiving any texels back and not producing any pixels. The second rasterizer removes primitives from the FIFO output and makes the identical requests at a later time, receives the texels from the texture cache controller, and produces the pixels. The depth of the primitive queue combined with the number of pixels per primitive determines the potential time difference between the two request streams.

In approach (2), the single rasterizer processes primitives and makes texture requests and outputs partially complete pixel data into a pixel FIFO. This partial pixel data includes all data that is necessary to finish computing the pixel once the texture requests are honored. At the output side of the pixel FIFO, the partial pixel is completed, which produces the identical stream of texture requests, receives the texels, and produces completed pixels. The depth of the pixel queue determines the potential time difference between the two request streams.

The Texture Cache Control

The texture cache control has two conceptual caches: the virtual cache, and the physical cache. The virtual cache is associated with the first (pre-fetch) request stream, and has no data directly accompanying the cache entries (requests to this cache do not return any data). The physical cache is associated with the second (actual) request stream, and has real texture data accompanying each cache entry (and thus returns data to the requester). These caches have the same number of entries.

The virtual cache controls and tracks the future contents of the physical cache, thus at any position in its request stream it has a set of cache key and entry associations which the physical cache will have at the same relative position in its request stream (at a future time).

Upon receiving a request (a new 'key'), the virtual cache performs the comparison against its current set of keys. If the requested key is not in the virtual cache, then a cache replacement operation is performed. The virtual cache replacement includes 1) selecting an entry for replacement (via LRU or some other algorithm), 2) replacing the key for that entry, and 3) invoking the (memory and) decompression subsystem to begin the process of fetching and decompressing the data associated with that key. The particular implementations shown in FIGS. 9B and 9C, the decompression subsystem includes the command and memory control 380, compressed cache 416, and decompression engine 404.

The output of the decompression subsystem is a block of texture data which is then placed into an entry in the physical cache (the texture cache 402, for example). In the tiler shown in FIGS. 9B and C, processing performed by the decompression subsystem is performed in a multi-entry pipeline in which serial order is maintained.

Note that if the requested key was already in the virtual cache, then no action is required because the associated data will be in the physical cache at the time it is requested from the second request stream.

Requests to the physical cache result in a similar key comparison to see if the requested data is already in the cache. If a matching key is found, then the associated data is returned. If a match is not found, then the next data output by the decompression subsystem is guaranteed to be the desired data. Note that the physical cache does not perform any replacement entry selection processing - the entry in the physical cache replaced by this new data is dictated by the virtual cache via a cache entry 'target' index computed by the virtual cache controller and passed through the decompression subsystem with the requested data.

Correct functioning of the scheme requires that flow control be applied to the interface between the decompression subsystem and the physical cache. If decompressed data is allowed to overwrite its targeted entry in the physical cache immediately upon being available, it is possible that all of the references to the previous contents of that cache entry may not have been completed. (Note that the physical cache controller also may have to wait for data to be output by the decompression subsystem.)

This flow control is accomplished by waiting until the new entry is requested before overwriting the previous entry's contents. Placing new data into the texture cache is thus always deferred until the last moment until it is needed.

Since this replacement is deferred until it is needed, any time required to place the data into the physical cache can introduce latency into the process driving the second request stream. Two schemes for alleviating this latency are as follows.

The first scheme is to double buffer data in the physical cache. This allows the decompression subsystem to immediately write each entry's data into its side of the double buffer, and the physical cache controller can do a (presumably fast) buffer swap to map the data into its side of the cache. The decompression subsystem only has to wait if the entry to be filled is already full and has not been swapped yet. Note that the cache replacement algorithm used by the virtual cache controller will tend to not repeatedly overwrite the same entry, thus 'spreading out' the writes to the cache entries.

The second scheme is for the physical cache to have one or more 'extra' entries in addition to the number of 'keyed' entries. The number of keyed entries is the number for which cache keys exist, and matches the number of entries in the virtual cache. The number of extra entries represents the number of entries which are unmapped (i.e. not currently keyed). The sum of these is the total number of data entries in the physical cache.

In the second scheme, all cache entries can transition between unmapped to mapped (associated with a key). The set of unmapped entries forms a FIFO of entries into which the decompression subsystem writes completed blocks of data. A separate FIFO structure is maintained for the target indices associated with these unmapped entries. When a request to the physical cache is made for which a matching key is not present, the first entry in the queue of unmapped of entries is mapped in to the targeted index and associated with that key. The replaced entry is unmapped and placed (empty) at the end of the unmapped queue.

Cache Key Generation

The basic premise of the scheme is that two identical streams of requests are generated. It is not a requirement, however, that the specific keys which are associated with these requests be identical.

The cache keys which form the first (early) stream of requests are used to control the reading and subsequent decompression of texture data. These keys must have some direct relevance to the requested data (such as a memory address).

The cache keys which form the second (later) stream of requests do not need to precisely match the content of the first stream—it is only a requirement that there be a unique one-to-one mapping between the two. This is due to the fact that the keys for the second stream are used only for matching existing cache entries, not for any data fetching operation. The critical fact here is that the association between the physical cache's key and a cache entry is made when the new data is mapped in to the physical cache, and the index of the associated entry is computed by the virtual cache and passed through the decompression subsystem.

This fact can be exploited to simplify the controls for the process which is generating the keys for the second request stream, since the keys for the stream need only be unique and not precisely 'correct'.

Figure 12A:
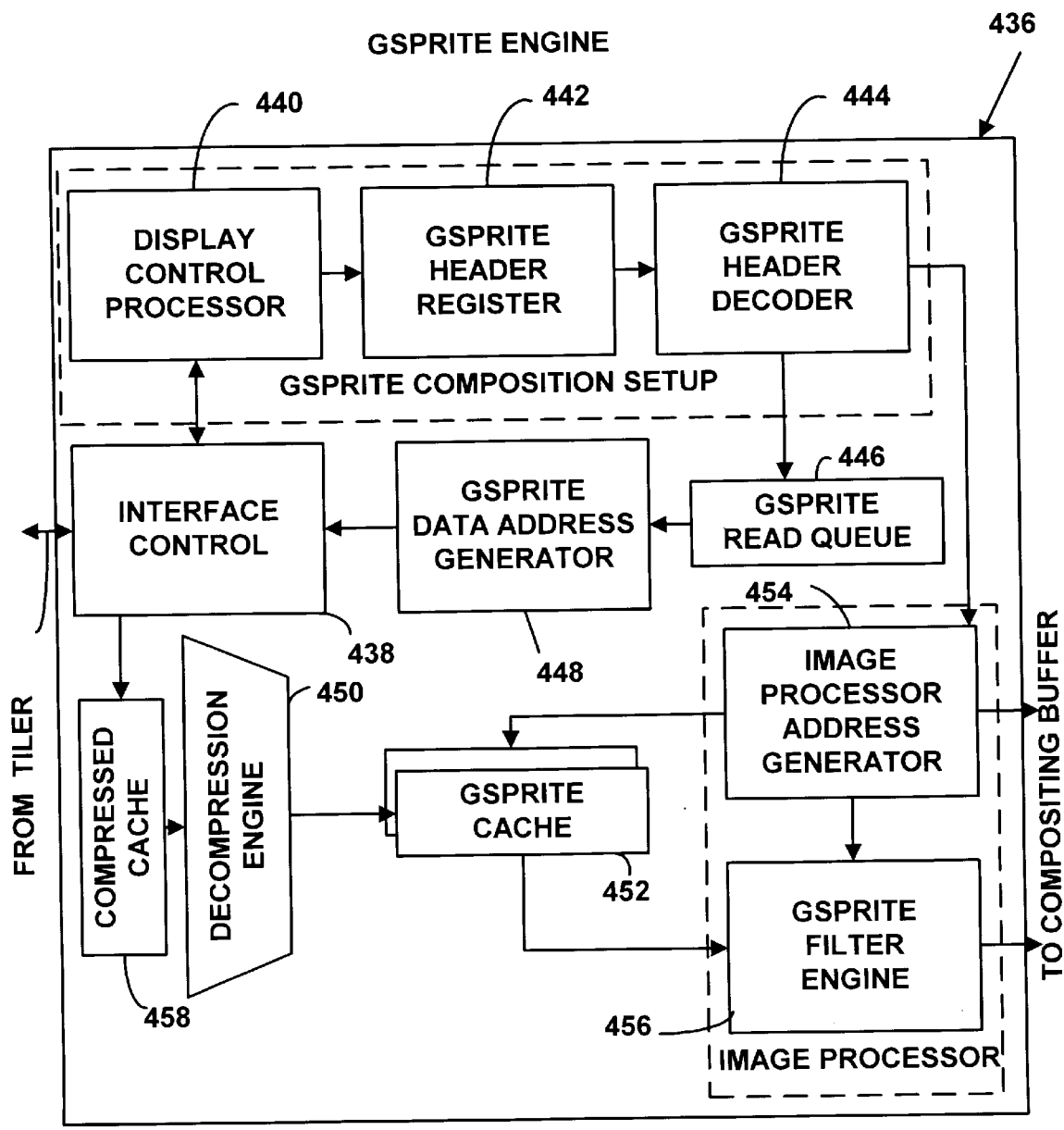
FIGS. 12A–B are block diagrams illustrating alternative implementations of a gsprite engine.

FIG. 12A is a block diagram illustrating the gsprite engine 436 on the image processing board 174. The gsprite engine 436 is responsible for generating the graphics output from a collection of gsprites. It interfaces with the tiler memory interface unit to access the gsprite data structures in shared memory. Gsprites are transformed (rotated, scaled, etc.) by the gsprite engine and passed to the compositing buffer where they are composited with pixels covered by other gsprites.

Interface control 438 is used to interface the gsprite engine with the shared memory system via the tiler. This block includes a FIFO to buffer accesses from the memory before they are distributed through the gsprite engine.

The display control 440 processor is used to control the video display updates. It includes a video timing generator which controls video display refresh, and generates the timing signals necessary to control gsprite accesses. This block also traverses the gsprite display data structures to determine which gsprites need to be read for any given 32-scanline band.

The gsprite header 442 registers store gsprite header data which is used by the image processor address generator 454 and gsprite filter engine 456 to determine the transformations on each gsprite. It is also used by the gsprite header decoder 444 to determine the blocks ( in this case, the 8×8 compression blocks) required to render the gsprite in each band.

The gsprite header decoder 444 determines which blocks from each gsprite are visible in the 32-scanline band and generates block read requests which are transferred to the gsprite read queue 446. This block also clips the gsprite to the current band using the gsprite edge equation parameters. This process is described in more detail below.

The gsprite read queue 446 buffers read requests for gsprite blocks. This queue stores requests for sixteen blocks, in this embodiment.

The gsprite data address generator determines the address in memory of the requested gsprite blocks and sends gsprite read requests to the interface control block. The gsprite data address generator 448 includes a memory management unit.

Compressed data retrieved from shared memory 216 (FIG. 4A) can be temporarily stored in the compressed cache 458.

The decompression engine 450 includes two decompressors, one which implements a DCT based algorithm for continuous tone images such as 3-D gsprites and images, and the other which implements a lossless algorithm for desktop pixel data. The DCT based algorithm is implemented by two parallel decompression blocks, each of which can generate eight pixel elements (i.e. 2 pixels) per clock cycle.

The gsprite cache 452 stores decompressed, gsprite data (R G B$\alpha$) for sixteen 8×8 blocks. The data is organized so that 16 gsprite pixels can be accessed every clock cycle.

The image processor address generator 454 is used to scan across each gsprite based on the specified affine transformation and calculate the filter parameters for each pixel. Gsprite cache addresses are generated to access gsprite data in the gsprite cache 452 and feed it to the gsprite filter engine 456. The image processor address generator 454 also controls the compositing buffer.

The gsprite filter engine 456 calculates the pixel color and alpha for pixel locations based on the filter parameters. This data is transferred to the compositing buffers for compositing. This block 456 computes a 4 or 16 pixel filter kernel based on the gsprite s and t coordinates at a pixel location. The filter may, for example, either be bilinear or a more sophisticated sum-of-cosines function. The 16 pixel filter kernel can have negative lobes allowing much sharper filtering than is possible with bi-linear interpolation. The gsprite filter engine 456 generates four new pixels to be composited every clock cycle. These pixels are aligned in a two by two pattern.

The gsprite engine 436 interfaces to the tiler 200 and the compositing buffer 210. Control signals control video timing and data transfer to the DAC 212.

Figure 12B:
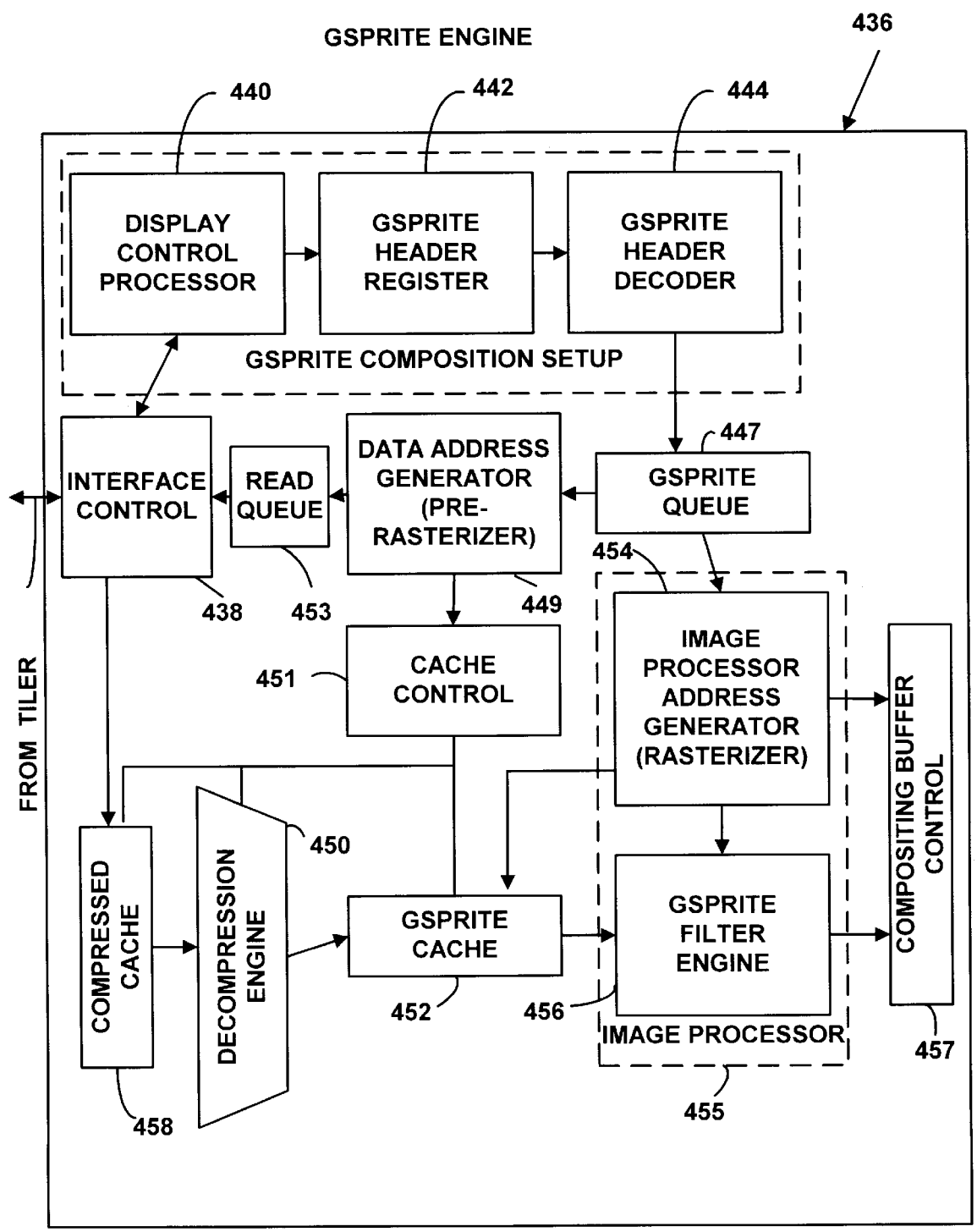

FIG. 12B is a block diagram of an alternative implementation of the gsprite engine 437. This particular implementation includes both a pre-rasterizer 449 and rasterizer 454 so that the gsprite engine can convert gsprite pixel data from gsprite space to screen space without incurring the latency in retrieving and decompressing blocks of gsprite pixel data.

The dual rasterizer approach used in this implementation is described above in connection with FIG. 11 and 9C.

The operation of the blocks in the gsprite engine 437 is generally the same as described above for FIG. 12A except that this implementation uses the dual rasterizer method for fetching blocks of texture data. In this implementation (FIG. 12B), the gsprite header decoder 444 reads the gsprite header register 442, clips the gsprite to the current display band, and places the gsprite in the gsprite queue 447 for rasterization. The data address generator or "pre-rasterizer" 449 scans each gsprite based on the specified affine transform in the gsprite header and generates read requests to the gsprite cache control 451. Using a method described above in connection with the texture cache control, the sprite cache control 451 ensures that the required gsprite data blocks are in the gsprite engine 437 and specifically in the gsprite cache 452 when the image processor block 455 needs them. It manages the flow of gsprite data blocks from the compressed cache 458, through the decompression engine 450, and into the gsprite cache 452. The read queue 453 buffers requests for gsprite data blocks to the shared memory system, and the interface control 438 reads the requests in the read queue 453, controls accesses to shared memory, and places blocks of gsprite data in the compressed cache 458.

The decompression subsystem in the gsprite engine includes the compressed cache 458 and decompression engine 450. The cache control 451 controls the flow of gsprite blocks through this decompression subsystem as described above in connection with the texture cache control.

The image processor address generator (rasterizer) 454 scans each gsprite based on the specified affine transform in the gsprite header and calculates the filter parameters for each pixel. It also generates gsprite cache addresses of gsprite data, which it sends to a cache address map in the gsprite cache for use by the gsprite filter engine 456. In one specific implementation of the cache, the cache address map selects which 14 pixel blocks are active and which two blocks are filled from the decompression engine.

The gsprite filter engine 456 maps color and alpha data at pixel locations in gsprite space to screen space. In this implementation, it applies either a 2×2 or 4 by 4 filter kernel to compute pixel values (color or both color and alpha) at pixel locations in screen space. The compositing buffer control 457 passes pixel values, in this case four pixels per clock cycle, to the compositing buffer. The compositing buffer control 457 monitors the ready line from the compositing buffer to ensure that the gsprite engine 437 does not overrun the compositing buffer. The rasterizer 454 controls the compositing buffer control 457.

Figure 13:
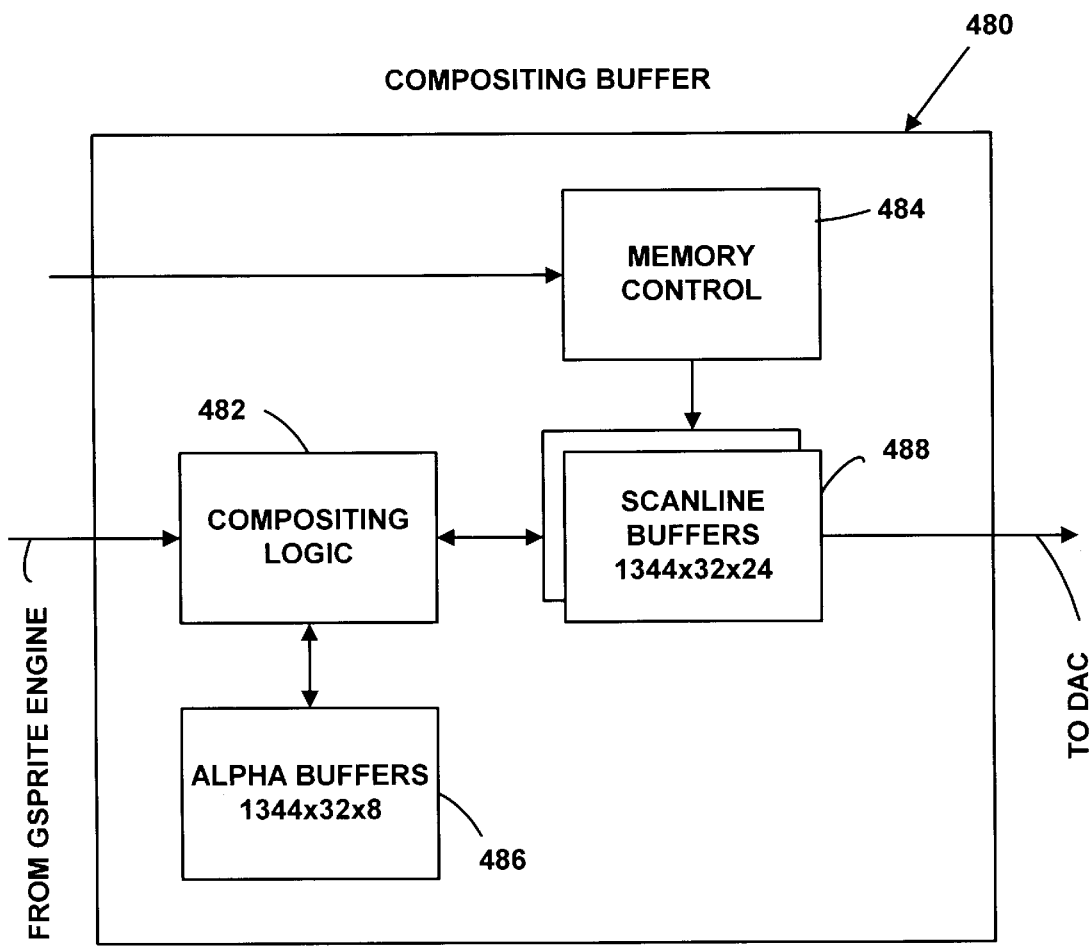
FIG. 13 is a block diagram of a compositing buffer in an embodiment.

FIG. 13 is a block diagram illustrating the compositing buffer 480 on the image processing board 174. The compositing buffer 480 is a specialized memory device that is used to composite gsprite data from the gsprite engine and generate digital video data to transfer to the DAC 212. The compositing buffer operates on 32 scanlines at a time—compositing gsprites for one 32 scanline band while the previous 32 scanlines are displayed.

The compositing logic 482 is responsible for calculating the pixel values as they are written into the scanline buffer. This is accomplished by performing a blending operation between the pixel value that is currently stored in the scanline buffer and the one that is being written to the compositing buffer. This operation is described in more detail below. In one implementation, the compositing logic performs four parallel pixel operations per clock cycle.

The memory control 484 is used to control the address and cycling of the memory banks. Address information is passed in a row column format as with normal DRAMs.

The alpha buffers 486 include an eight bit value for each of 1344×32 pixels. The memory is organized such that four contiguous pixels can be read and written each clock cycle. The alpha buffer also has a fast clear mechanism to quickly clear the buffer between 32-scanline band switching.

Two independent scanline buffers 488 are provided. The scanline buffers include three eight bit color values for each of 1344×32 pixels. The memory is organized such that four contiguous pixels can be read and written each clock cycle. One buffer is used to transfer the pixel data for a band to the DAC while the other is used to composite the pixels for the next band. Once the band has been completed, their functions swap.

A multiplexer is used to select data from one of the two scanline buffers 488 and sends the pixel display data to the DAC. The multiplexer switches between buffers every 32 scanlines.

The compositing buffer 480 interfaces to the gsprite engine 204, and transfers image data to the DAC 212.

Figure 14:
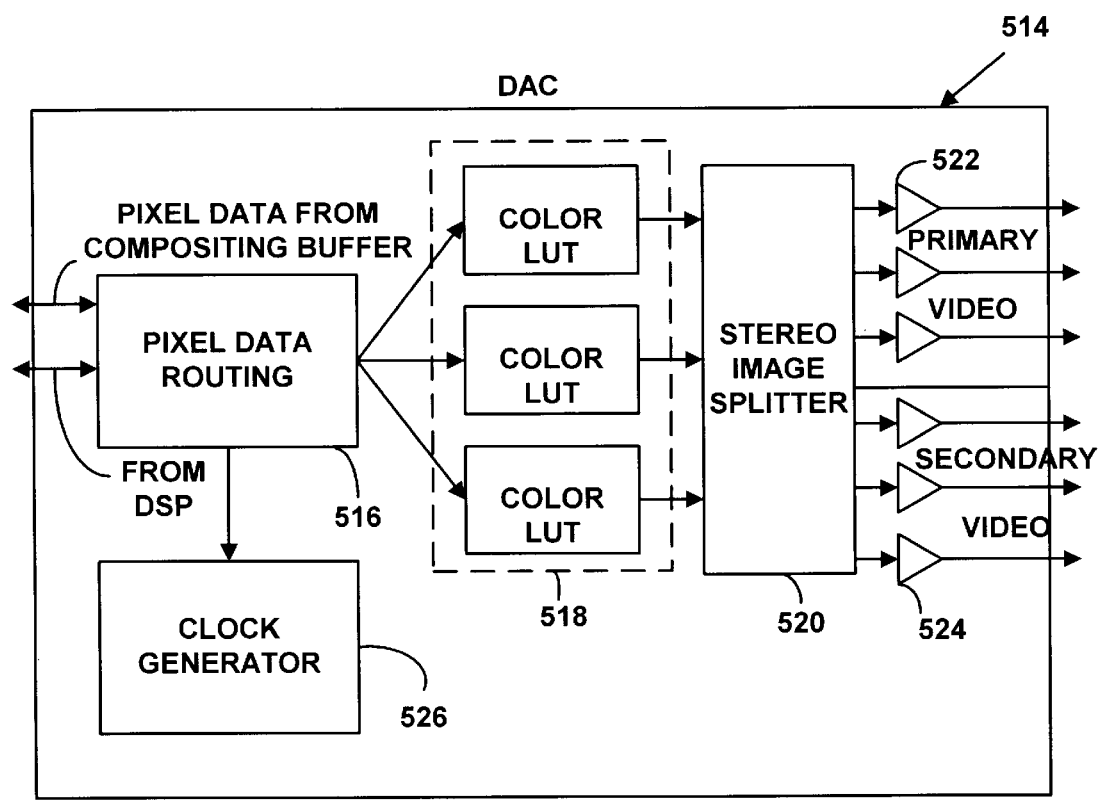
FIG. 14 is a block diagram of a Digital to Analog Converter (DAC) in an embodiment.

FIG. 14 is a block diagram illustrating the DAC 514 on the image processing board 174. The DAC 514 implements the basic functions that are common to most RAMDACs on the market today. The DAC includes logic for reading and writing internal control registers, and for pipelining the video control signals. Additional functional blocks are described below.

The pixel data routing block 516 is used to control the routing of pixel data from the compositing buffers. In the normal operating mode, this data is passed at pixel rates to the Color LUTs 518 for each of the three channels. This block also allows the data to be read back to the DSP for diagnostic purposes.

The stereo image splitter 520 supports two separate video signals for stereoscopic display using a head mounted display system. In this mode, the two video channels (522, 524) are interleaved from the compositing buffer, and must be split out by the DAC 514. The stereo image splitter 520 performs this function on the DAC 514. In the normal single channel mode, the LUT data is passed directly to the Primary DACs.

Alternatively, the DAC 514 can be designed to generate a single video output. With a single video output, the DAC can generate a stereoscopic display using a line interleaved format, where one scanline for one eye is followed by the scanline for the other eye. The resulting video stream has a format such as 640×960, for example, which represents two 640×480 images.

The clock generator 526 is used to generate the video and audio clocks. These clocks are generated by two phase locked clock generators to eliminate synchronization drift. The clock generator can also be slaved to a control signal from the Media Channel, allowing the image processing board to sync to an external sync source.

Tiling

As outlined above, the image processor (FIG. 1) performs scan-conversion, hidden surface removal, anti-aliasing, translucency computation, texturing, and shading. In this section we describe scan conversion, hidden surface removal, anti-aliasing and translucency computation in detail.

Figure 4B:
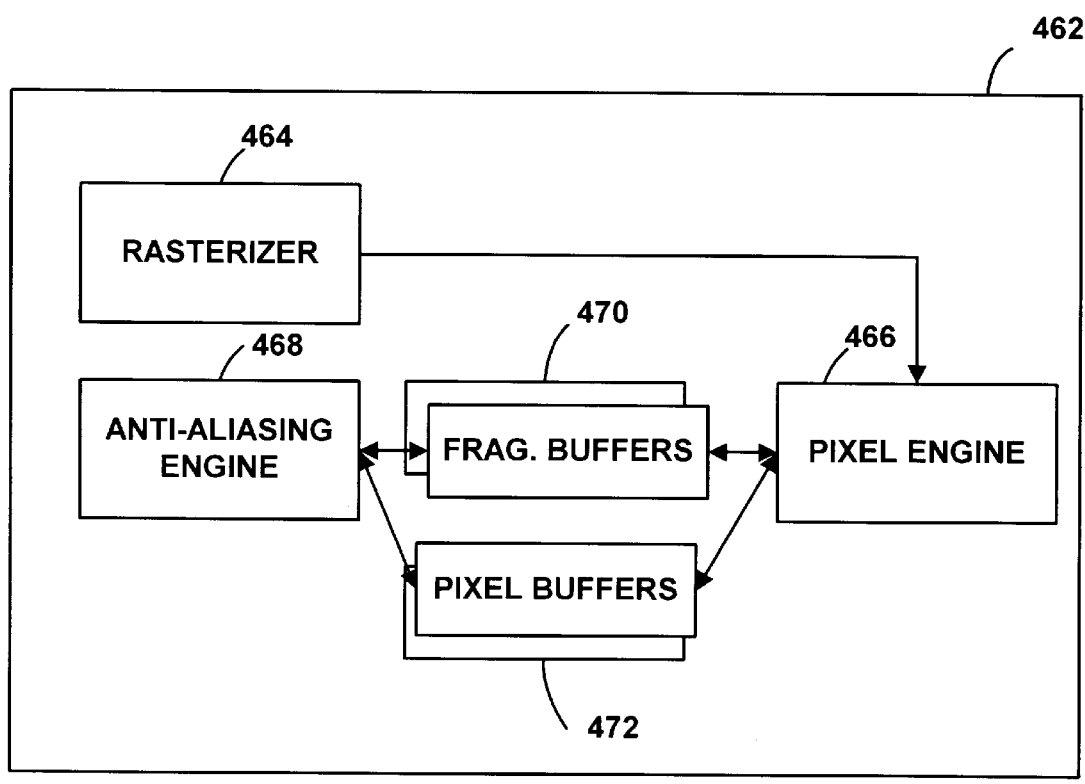
FIG. 4B is a block diagram illustrating portions of an image processor for rendering geometric primitives in an embodiment.

FIG. 4B is a block diagram illustrating portions of the image processor 462 for producing rendered image data from geometric primitives. The image processor includes a rasterizer 464, a pixel engine 466, an anti-aliasing engine 468, and a rasterization buffer, which includes pixel buffers 470, and a fragment buffer 472 in this embodiment. The "rasterizer" refers to the part of the image processor that determines pixel values from the geometric primitives, i.e. polygons. The rasterizer 464 reads primitive data and produces pixel data associated with a pixel location. This pixel data includes color, alpha, and depth (distance from the viewpoint). When a pixel is not entirely covered by a polygon, the rasterizer generates pixel fragment data.

As it scan converts a polygon, the rasterizer passes pixel data to the pixel engine for processing. The pixel engine 468 reads the pixel data from the rasterizer and determines which pixel data to store in the pixel and fragment buffers. The pixel buffers 472 are two-dimensional arrays, where the elements in the arrays correspond to pixel locations and include memory for storing color, alpha and depth data. The fragment buffer 470 stores fragment data to represent partial coverage of a pixel.

The pixel engine 466 performs hidden surface removal using depth values generated by the rasterizer and also maintains pixel fragments and translucent pixels for anti-aliasing and translucency processing. For a given pixel location, the pixel engine retains the nearest fully covered opaque pixel, if any. In this context, "fully covered" means that the pixel is entirely covered by a polygon that is being scan converted in the rasterizer. The pixel engine also retains pixels with translucency (alpha less than 1) and pixel fragments in front of the nearest opaque pixel. The pixel engine stores the nearest opaque pixel for a pixel location in the pixel buffer, and stores in the fragment buffer any fragments or translucent pixels at this pixel location that are in front of the nearest opaque pixel.

After the pixel engine generates pixel data, the anti-aliasing engine 468 resolves the pixel data in the pixel and fragment buffers. The design of the image processor illustrated in FIG. 4B supports double buffering of pixel data and single buffering of fragment data. The pixel engine generates pixel data in one of the pixel buffers, and adds fragment information into the fragment buffer while the anti-aliasing engine resolves the pixel data from the other pixel buffer and fragment data from the fragment buffer. As each fragment is resolved, the fragment entry is added to the fragment free list for use by new pixel data.

Having provided an overview of the process of generating and resolving pixel data, we now describe an embodiment in more detail. Below we describe an embodiment with reference to the tiler, shown generally in FIG. 4 and illustrated in more detail in FIGS. 9A–9C. We provide more detail regarding the tiler, including the components pertaining to scan conversion and anti-aliasing, as well as the components referring to textures. We will describe components used in multi-pass rendering, shading, and textures now, and will elaborate on these concepts later in our description.

The components of FIG. 4B can implemented on the tiler. The tiler reads primitive data and rendering instructions from the shared memory system 216 (FIG. 4A), produces rendered image data, and stores compressed image data in shared memory. As described above, the basic 3-D graphics primitives in the system are triangles. Triangle rendering provides numerous simplifications in hardware used for graphics generation since the triangle is always planar and convex. However, alternatively n-sided polygons can also be used.

Above we explained the components of the tiler 200. Here we describe the data flow through the tiler in more detail.

Since the tiler receives inputs from the DSP, we begin with a recap of functions of the DSP 176 (FIG. 4). As described above, the DSP 176 can perform front end geometry and lighting calculations required for 3-D graphics. The DSP 176 calculates model and viewing transformations, clipping, lighting, etc. Rendering commands are stored in main memory buffers and DMAed (Direct Memory Accessed) to the image processing board over a PCI bus. The rendering commands are then buffered in the shared memory 216 (FIG. 4A) until needed by the DSP. The rendering commands are read by the tiler 200 (FIG. 4A) when it is ready to perform image processing operations.

Figure 15A:
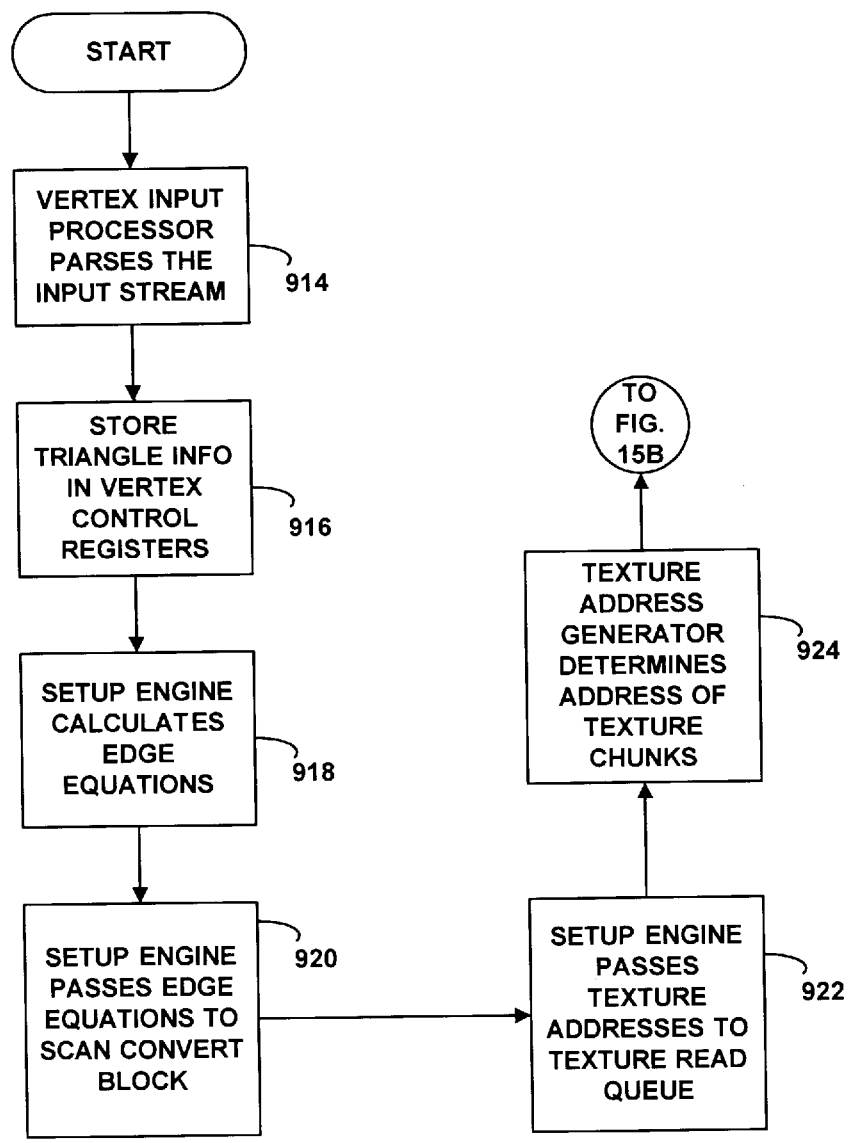
FIG. 15A–F are a flow diagrams illustrating aspects of pixel and fragment generation in three alternative embodiments.
Figure 15B:
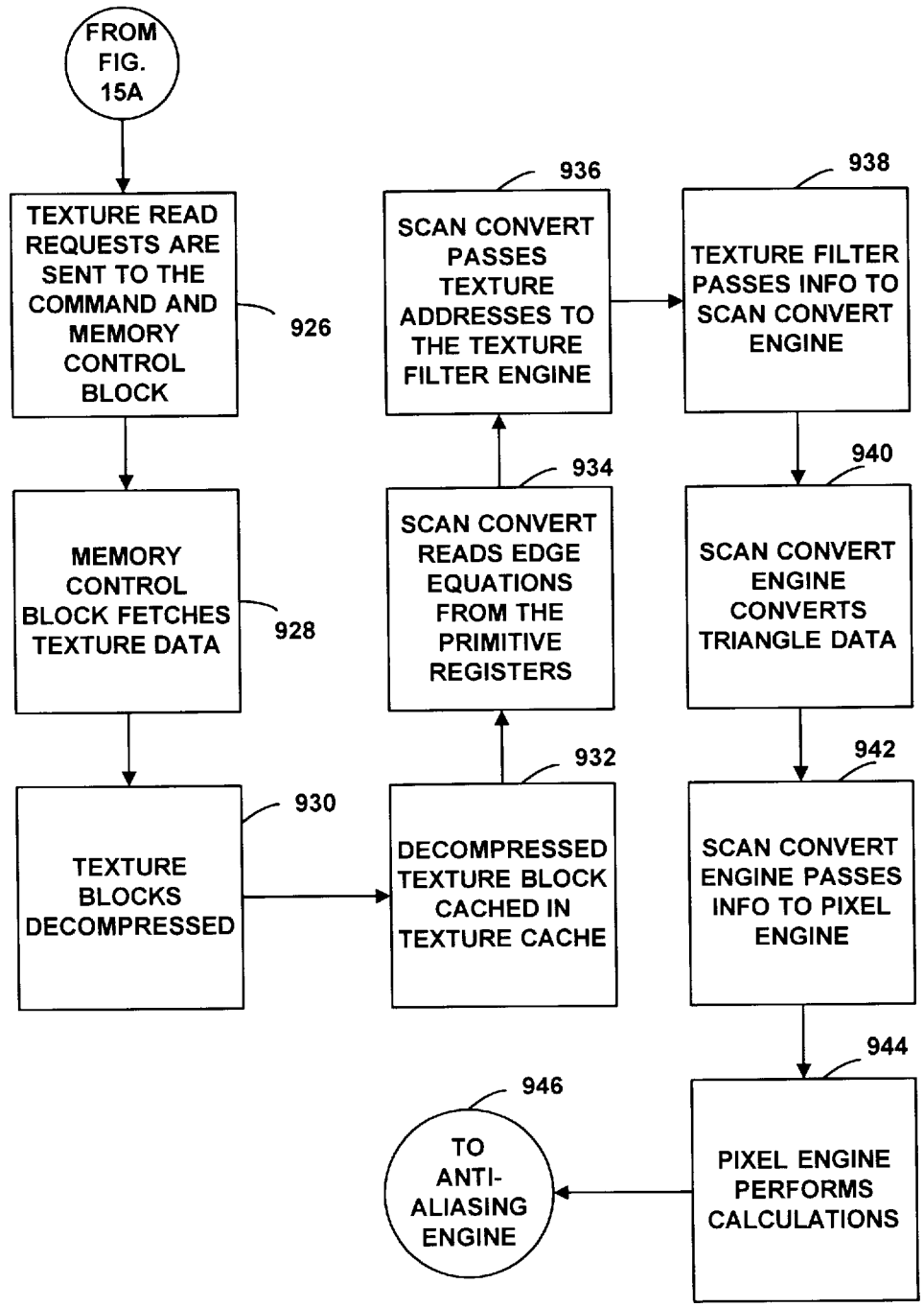

As is shown in the flowchart in FIGS. 15A and 15B, the setup block processes primitive rendering instructions read from the shared memory. The vertex input processor parses the input stream (914) (FIG. 15A), and stores the information necessary for primitive triangle processing in the vertex control registers (916).

The two vertex control registers store six vertices, three for each triangle in each register. The two vertex control registers allow for double buffering of triangle information to assure that the setup engine always has triangle information to process.

The setup engine then calculates the linear equations (918) which determine the edge, color, and texture coordinate interpolation across the surface of the triangle. These linear equations are used to determine which texture blocks will be required to render the triangle. The edge equations are also passed to the scan convert block (920) and are stored in the primitive registers within the scan convert block until required by the scan convert engine. The primitive registers are capable of storing multiple sets of edge equations.

The setup engine also passes texture addresses to the texture read queue (922), which buffers requests for texture chunks. The texture address generator then determines the address in memory of the requested texture chunks (924) and sends the texture read requests to the command and memory control block (926) (FIG. 15B), which will fetch the texture data (928) used by the scan convert block.

Texture data is stored in the shared memory (216) (FIG. 4A) in a compressed image format which may be the same format as the image data. The compression format is performed on individual 8×8 pixel blocks. The 8×8 blocks are grouped together in 32×32 blocks for memory management purposes to reduce memory management overhead.

As texture blocks are needed, they are fetched into the tiler, decompressed by the decompression engine (930), and cached in an on-chip texture cache (932). A total of 32 8×8 pixel blocks can be cached, although each block stores only one color component. The texture data is cached in an R G B and Alpha format.

The scan convert engine then reads the edge equations from the primitive registers (934) to scan convert the triangle edge information. The scan convert engine includes interpolators for walking the edges of the triangles, interpolating colors, depths, translucency, etc.

The scan convert engine passes texture addresses to the texture filter engine (936). The texture filter engine calculates texture data for the polygons that are being rendered. The texture filter engine computes a filter kernel based on the Z-slope and orientation of the triangle, and on the s and t coordinates. The texture cache attached to the texture filter engine store texture data for sixteen 8×8 pixel blocks. The texture cache is also in communication with the decompression engine which will decompress texture data (which is stored in a compressed format) for use by the texture filter engine.

When the texture filtering is completed, the texture filter engine passes the information back to the scan convert engine (938), so it can be used by the scan convert engine for further processing. Along with texture processing, the scan convert engine scan converts the triangle edge data (940) and the individual pixel addresses along with color and depth information are passed to the pixel engine for processing (942).

Figure 15C:
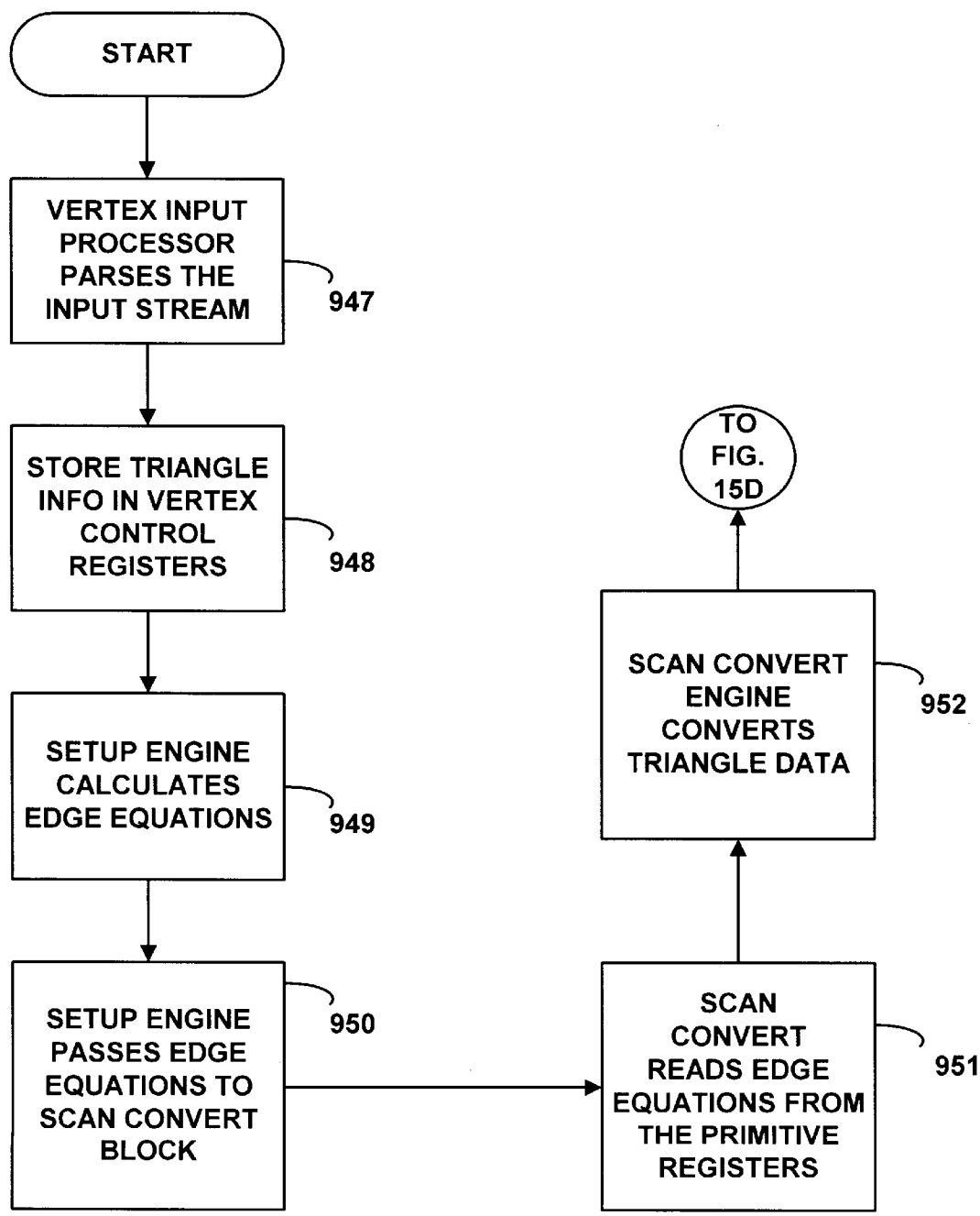
Figure 15D:
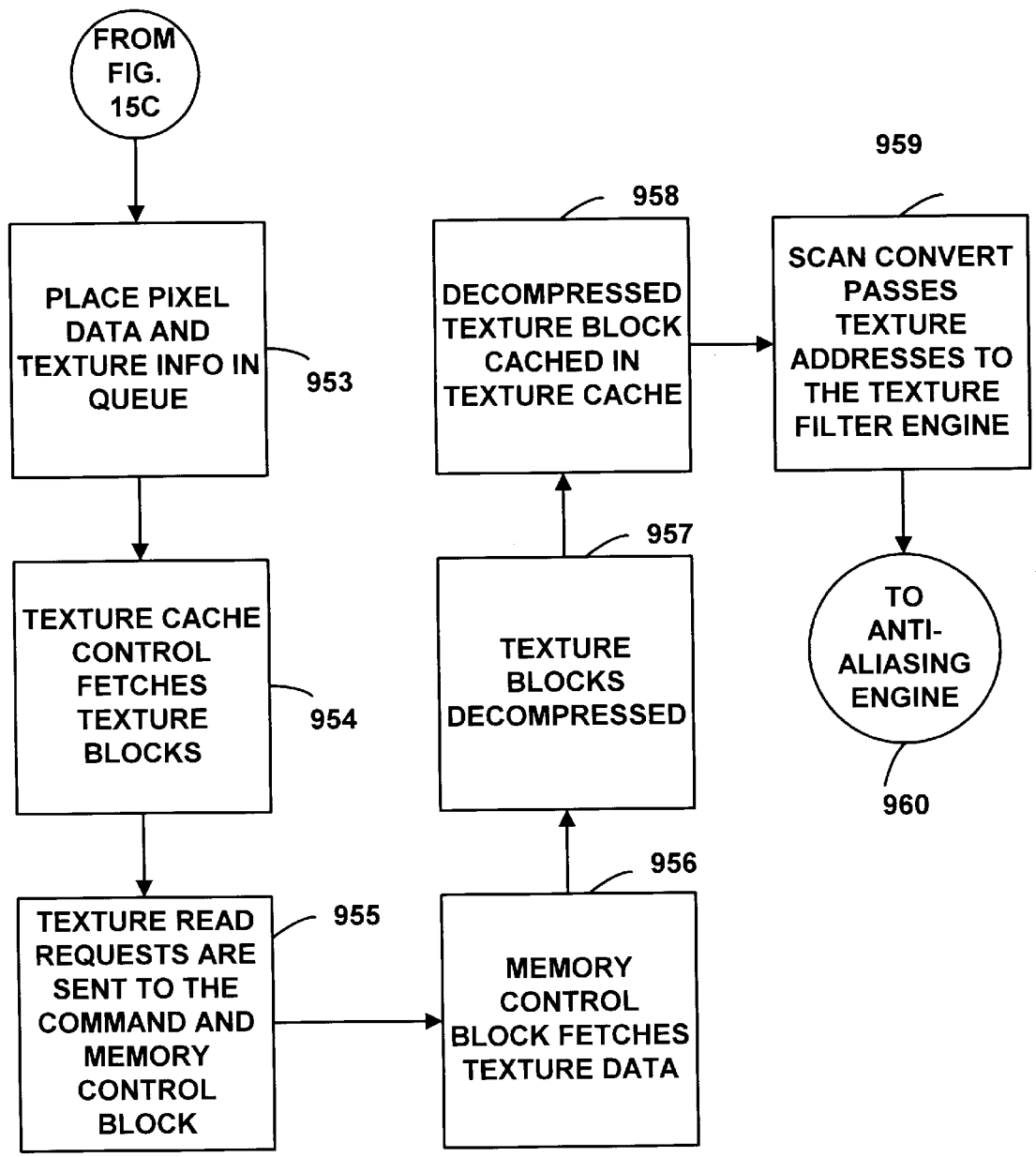
Figure 15E:
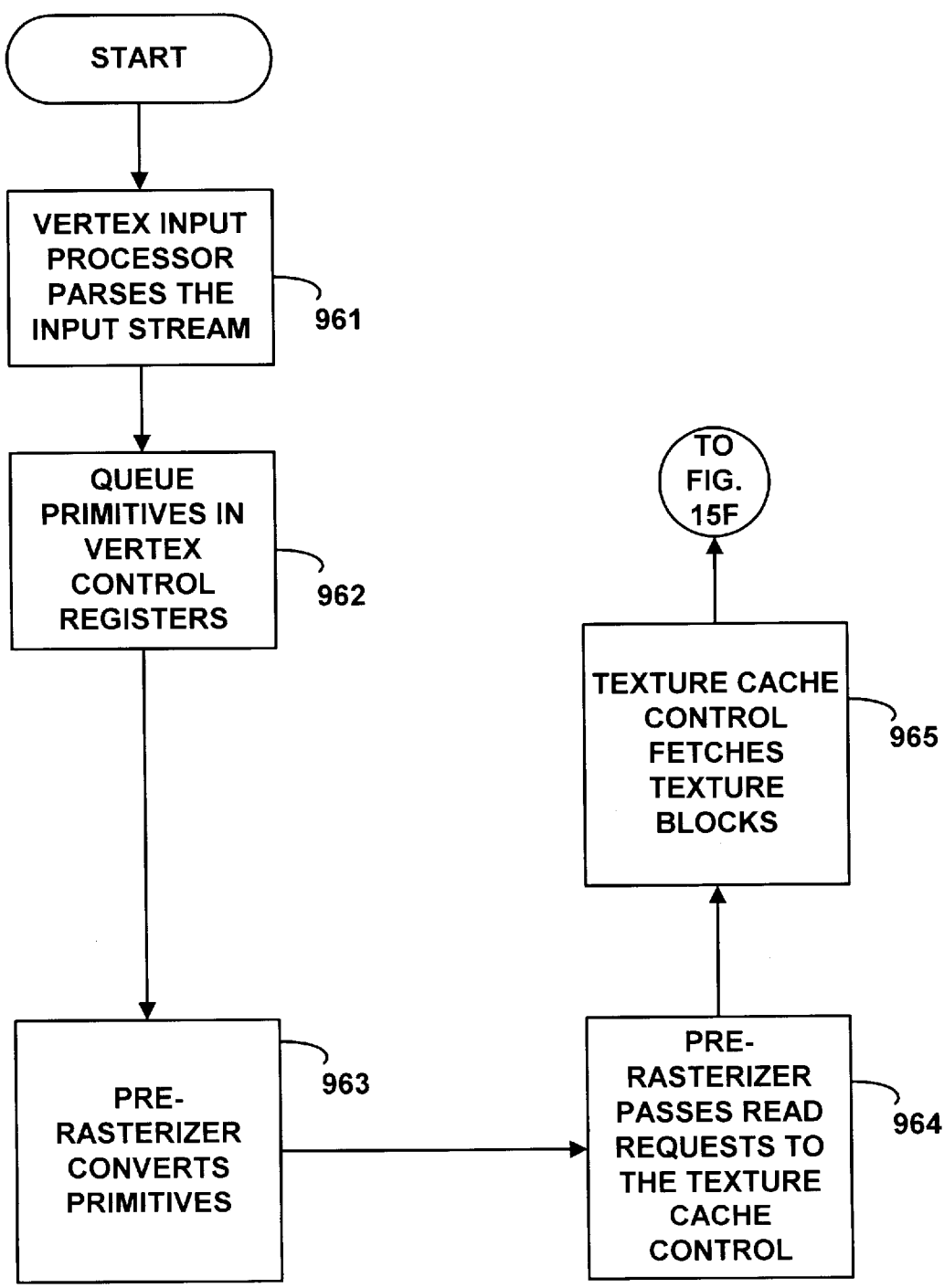
Figure 15F:
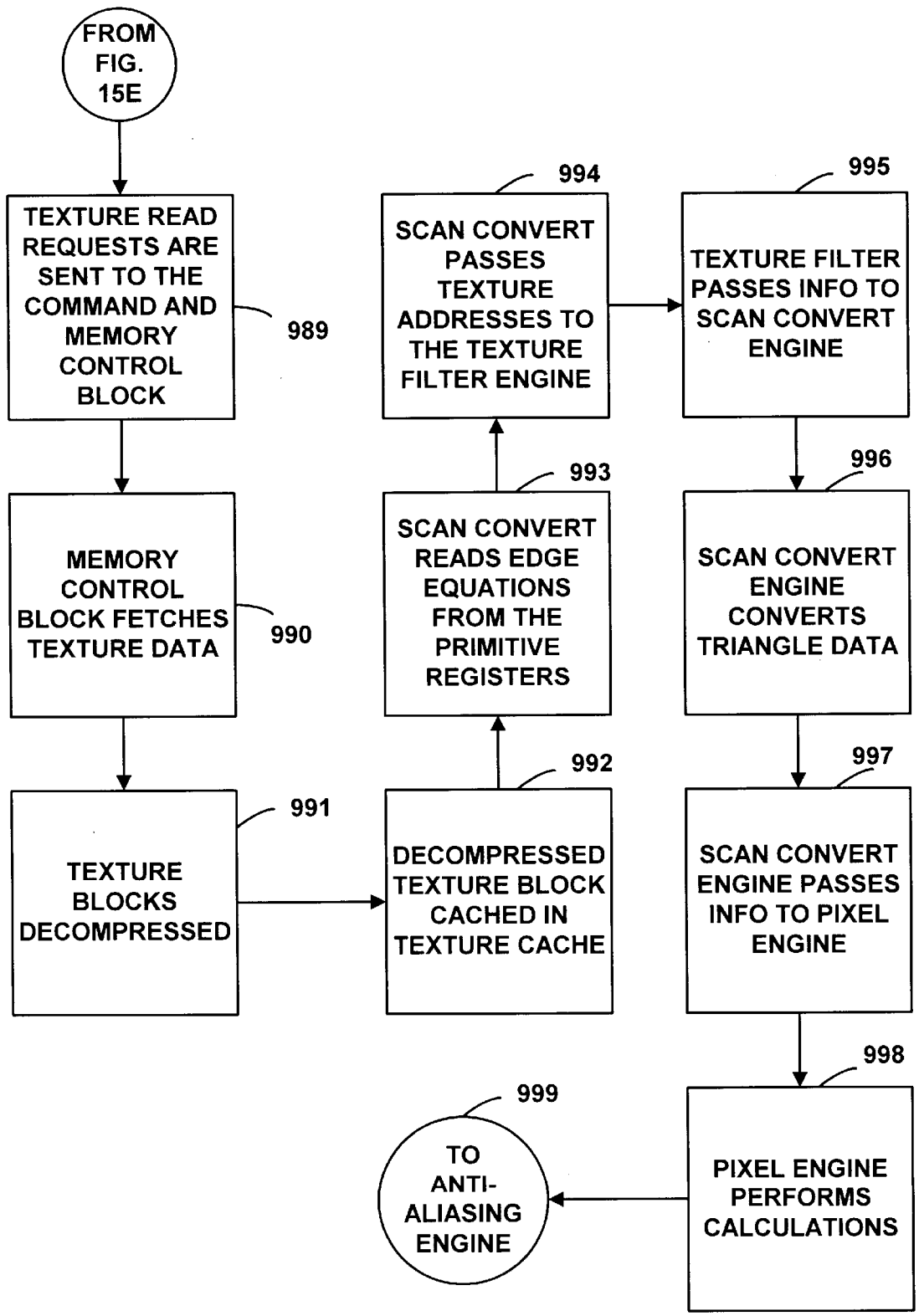

The method illustrated in FIGS. 15A and 15B varies for the alternative methods described in connection with FIGS. 10 and 11. FIGS. 15C and 15D illustrate a method for accessing image data corresponding to FIG. 10 and 9B. Similarly, FIGS. 15E and 15F illustrate a method for accessing image data corresponding to FIG. 11 and 9C.

Referring first to FIGS. 15C and 15D, this implementation of the method begins in the set-up block 381 in FIG. 9B. The vertex input processor 384 processes the input data stream (947). Next, the vertex control registers 386 buffer triangle data from the input data stream (948). The set-up engine 388 then calculates the edge equations (949) and passes them to the scan convert block 395 (950).

The scan convert block 395 reads edge equations stored in the primitive registers (951) and scan converts triangle data (952). The scan convert engine 398 then writes pixel data including the pixel address, color and alpha data, and coverage data to an entry in the texture reference data queue 399 (953) (FIG. 15D). In the case of texture mapping operations, this entry also includes texture reference data, namely, the coordinates of the texture centerpoint. The entry may also include texture filter data such as level detail or anisotropic filter control data.

From the texture reference data, the texture cache control 391 determines which texture blocks to fetch and causes the appropriate texture block or blocks to be fetched from memory (954).

The texture address cache control 391 sends texture read requests to the command and memory control block 380 (955). The texture read queue 393 buffers read requests for texture blocks to the shared memory system. The memory control 380 fetches the texture data from shared memory, and if it is compressed, places the compressed block or blocks in the compressed cache 416 (956). The decompression engine 404 decompresses compressed image data and places it in the texture cache 402 (957, 958). As described above in connection with FIG. 10, the replacement of blocks in the texture cache proceeds according to a cache replacement algorithm.

To carry out texture mapping or other pixel operations requiring image data in the texture cache, the texture filter engine 401 reads texture addresses from the texture reference data queue 399 (959). The texture filter engine 401 accesses the image data in the texture cache 402, computes the contribution from texture, and combines this contribution with the color and possibly alpha data from the texture reference data queue 399.

The texture filter engine 401 passes pixel data to the pixel engine 406, which then performs hidden surface removal and controls storage of the pixel data to a rasterization buffer.

FIGS. 15E and 15F illustrate a method for accessing image data blocks from memory corresponding to the approach in FIG. 11. In this alternative implementation, the method begins by queuing primitives in the set-up block 383. The vertex input processor 384 parses the input data stream and queues triangle data in the vertex control registers 387 (961, 962). When image data blocks need to be accessed from memory, as in the case of a texture mapping operation, the pre-rasterizer 389 scan converts primitives queued in the vertex control registers 386 to generate read requests for texture data blocks in shared memory (963).

As the pre-rasterizer scans a primitive queued in the set-up block, it passes texture read requests to the texture cache control 391 (964). The texture cache control 391 determines the appropriate texture blocks (965) and transfers read requests to the command and memory control block 380 (989) (FIG. 15F) via the texture read queue 393. The memory control block fetches the requested texture data, and if it is compressed, stores it in the compressed cache 416 (990). The decompression engine decompresses texture blocks in the compressed cache 416 and writes the decompressed image data to the texture cache 402 (991, 992). The texture cache control manages the flow of texture blocks from the compressed cache 416, through the decompression engine 404, and into the texture cache 402.

The scan convert block 397 reads the geometric primitives queued in the set-up block. The scan convert block 397 performs pixel generation operations as soon as requested texture data is available in the texture cache 402. In the process of performing these pixel operations, the scan convert engine 398 reads edge equations from the primitive registers (993) and passes texture addresses to the texture filter engine 403 (994). The texture filter engine accesses the appropriate image data stored in the texture cache 402 and then returns filtered data to the scan convert block 397 (995). The scan convert block 397 converts the triangle data and computes output pixel data from converted triangle data and the filtered data (996). It then passes this output pixel data to the pixel engine 406.

Image Compression

As was described above, the chunk size and sequential rendering is very valuable for image compression techniques since an entire 32×32 pixel chunk is completely rendered before the next chunk is computed, and thus can be compressed immediately. The tiler supports a lossy and lossless form of compression to compress chunks. Both the lossy and lossless form of compression compress chunks in independent blocks of 8×8 pixels, so each compressed 32×32 pixel chunk would consist of 16 such compressed blocks.

Figure 16:
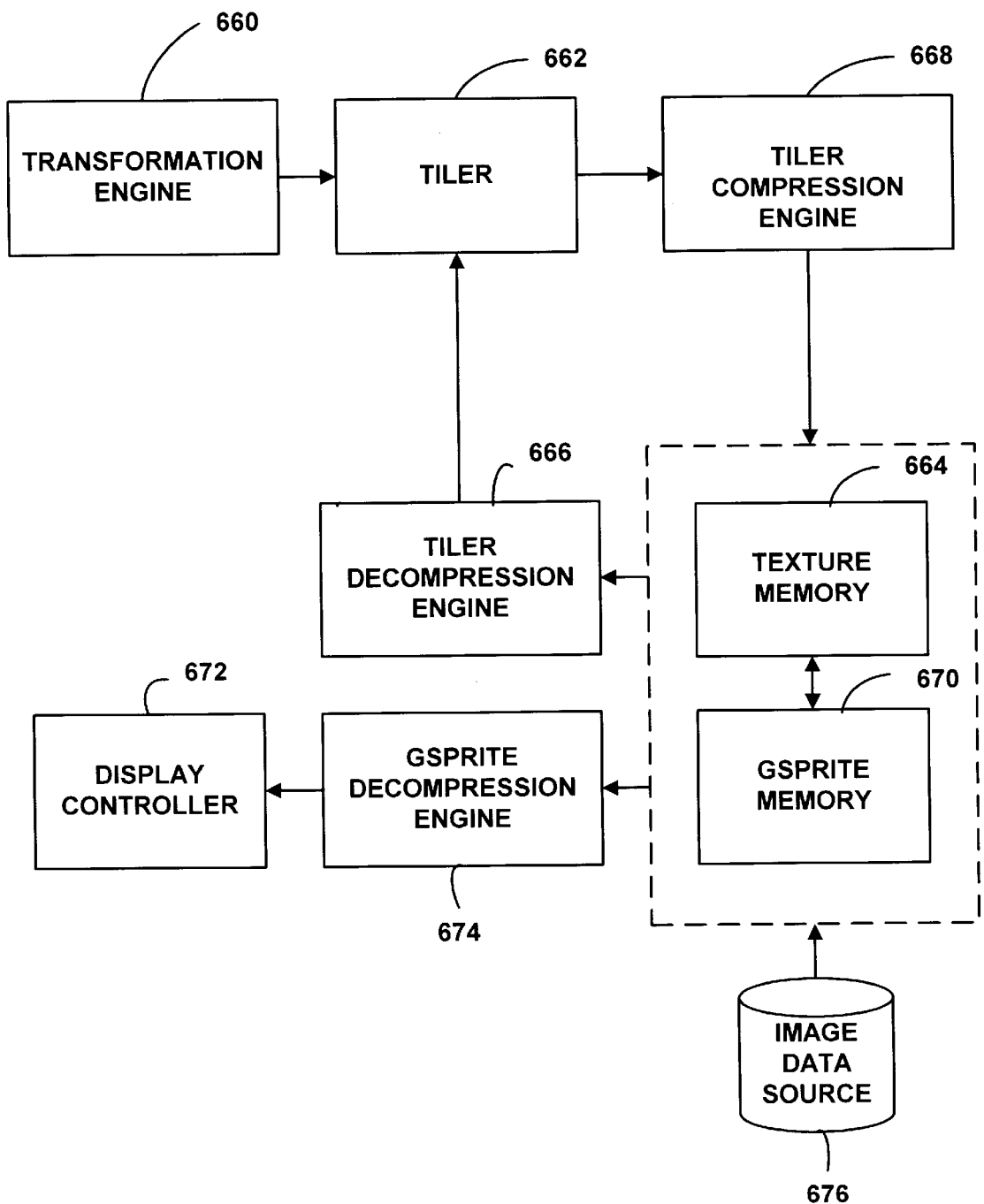
FIG. 16 is a block diagram of a rendering architecture supporting compression and decompression.

Compression of images allows much smaller memory size requirements and vastly reduced memory bandwidth requirements. The design uses a combination of caching, prefetch strategies, as well as chunking to reduce the latencies and overhead due to compression and block access. Since the entire image is computed in a 32×32 pixel buffer, gsprite image compression is achieved with minimal overhead. The overall conceptual design of the compression architecture is shown in FIG. 16.

The transformation engine 660 (FIG. 16) calculates model and viewing transformations, clipping, lighting, etc. and passes this information to the tiler 662. As the tiler processes transformation information, it reads texture data from texture memory 664. The texture data is stored in a compressed format, so as the texture blocks are needed, they are decompressed by the tiler decompression engine 666 and cached in an on-chip texture cache on the tiler. As the tiler resolves pixel data it transfers the resolved data to the tiler compression engine 668 which compresses the resolved data and stores the compressed data in gsprite memory 670. When the gsprite engine 672 needs the compressed gsprite data, it uses the gsprite decompression engine 674 to decompress the gsprite data from gsprite memory 664 and cache the data on an on-chip gsprite cache. In the actual hardware, the texture memory 664 and gsprite memory 670 are identical (i.e. the compressed data is stored in one memory shared by the various engines). Common shared memory is not required as long as the compression and decompression methods used are compatible. The gsprite data can also be taken from a data base or some other image source 676 and saved in the texture memory 664 and the gsprite memory 670.

One implementation of the invention supports both lossy and lossless compression and decompression of pixel blocks.

The lossy form of image compression has two stages: a lossy first stage, and a lossless second stage. The lossy form of compression begins with an optional color space conversion from red, green, blue (R, G, B) intensity values to luminance (Y) and chrominance (U and V, also referred to as Cr and Cb) values. The lossy stage includes a direct cosine transform (DCT) and a quantization that reduces the accuracy of certain frequency components.

The second stage is a lossless form of compression comprising Huffman coding and run length encoding (RLE). Alternative coding methods such as arithmetic coding can be used in place of Huffman coding.

Decompression for the lossy method includes a decoding stage, a dequantization of the compressed data, an inverse DCT, and an optional color space conversion from YUV to RGB.

The lossless form of compression includes an optional lossless color space conversion from RGB to YUV, a prediction stage, and a lossless encoding stage. This encoding stage can be identical to the entropy coding stage in the lossy form of compression. Decompression for this lossless method comprises a decoding stage, an inverse prediction step on each color component, and an optional color space conversion from YUV to RGB.

Lossy Compression/Decompression

One specific implementation of the lossy compression method in the compression engine 414 (FIGS. 9A–C) of the tiler occurs in four or five steps:

1. Convert the RGB data input to a YUV-like luminance-chrominance system (optional).
2. Perform a forward, two-dimensional discrete cosine transform (DCT) individually on each color component.
3. Order the two-dimensional DCT coefficients in approximately a monotonically increasing frequency order.
4. Quantize the DCT coefficients: Divide by either a uniform divisor or a frequency-dependent divisor.
5. Encode the resulting coefficients using Huffman encoding with fixed code tables.

Lossy decompression occurs in four or five steps:

1. Decode the compressed data input using Huffman decoding with fixed code tables.
2. Dequantize the compressed data: Multiply by the uniform multiplier or the frequency-dependent multiplier used in the quantization step of compression.
3. Reorder the linear array of data into the proper two-dimensional order for DCT coefficients.
4. Perform an inverse, two-dimensional DCT individually on each color component.
5. Convert the colors in the YUV-like luminance-chrominance system to RGB colors, if the compression process included the corresponding optional step.

Color Space Conversion

The color space conversion transforms the RGB colors to a brightness-color system with brightness coordinate Y and color coordinates U and V. This luminance-chrominance system is not a standard color space. Using this system improves the degree of compression because the color coordinates require only a small fraction of the bits needed to compress the brightness. The lossless, reversible conversion applies to each pixel independently and does not change the value of alpha.

RGB to YUV (for compression)

The conversion from integer RGB values to integer YUV values uses this transformation:

$Y=(4R+4G+4B)/3-512$ $U=R-G$ $V=(4B-2R-2G)/3$

YUV to RGB (for decompression)

The conversion from integer YUV values to integer RGB values uses this transformation:

$R=(((Y+512)-V)/2+U+1)/2$ $G=(((Y+512)-V)/2-U+1)/2$ $B=((Y+512)/2+V+1)/2$

Discrete Cosine Transform

Images and textures are pixels that contain the amplitudes for three colors and the amplitude for opacity. The pixel positions correspond to a spatial location in an image or texture map. An image or texture in this form is in the spatial domain. For images or textures, the discrete cosine transform (DCT) calculates coefficients that multiply the basis functions of the DCT. Applying the DCT to an image or texture yields a set of coefficients that equivalently represent the image or texture. An image or texture in this form is in the frequency domain.

The DCT maps the amplitude of the colors and opacity of an 8 by 8 pixel block between the spatial domain and the frequency domain. In the frequency domain, adjacent coefficients are less correlated, and the compression process can treat each coefficient independently without reducing the compression efficiency.

The forward DCT maps the spatial domain to the frequency domain, and conversely, the inverse DCT maps the frequency domain to the spatial domain. One suitable approach for the forward and inverse DCT is the approach described in FIGS. A.1.1 and A.1.2 in *Discrete Cosine Transform*. Rao, K. R., and P. Yip. San Diego: Academic Press, Inc., 1990.

The two-dimensional DCT produces a two-dimensional array of coefficients for the frequency domain representation of each color component. Zigzag ordering rearranges the coefficients so that low DCT frequencies tend to occur at low positions of a linear array. In this order, the probability of a coefficient being zero is approximately a monotonically increasing function of the position in the linear array (as given by the linear index). This ordering simplifies perceptual quantization and LOD filtering and also significantly improves the performance of the run-length encoding (RLE).

Quantization

Quantization reduces the number of different values that the zigzag-ordered DCT coefficients can have by dividing the coefficients by an integer. Depending on the value of the compression type parameter, quantization can be either uniform or perceptual. Neither case modifies the DC frequency coefficient (index=0), but instead passes it along unaltered.

The quantization process begins with the specification of the quantization factor for an image or portion of an image. In this implementation, a quantization factor is specified for a 32×32 pixel chunk. A quantization index (QIndex) specifies a corresponding quantization factor (QFactor) to use for the chunk. The following table shows the relationship between QIndex and Qfactor.

| Quantization Factor | |
| --- | --- |
| QIndex | QFactor |
| 0 | 2 |
| 1 | 3 |
| 2 | 4 |
| 3 | 6 |
| 4 | 8 |
| 5 | 12 |
| 6 | 16 |
| 7 | 24 |
| 8 | 32 |
| 9 | 48 |
| 10 | 64 |
| 11 | 96 |
| 12 | 128 |
| 13 | 192 |
| 14 | 256 |
| 15 | 4096 |

Each color plane has a different value for the chunk QIndex. A QIndex of 15 selects a QFactor of 4096, which produces zeros during quantization and inverse quantization. The quantization process divides each coefficient in a block by a QFactor and rounds it back to an integer. The inverse quantization process multiplies each coefficient by a QFactor. Quantization and inverse quantization do not change the DC frequency component.

Block Quantization Factor

The QIndex, and thus the QFactor, can vary from block to block (8×8 pixels). The QIndex for a block results from incrementing the QIndex for the chunk with a value embedded in the block compression type:

Block QIndex=Chunk QIndex+(Block Compression Type−3)

This increments the chunk QIndex by one, two, three, or four. Because the largest possible QIndex value is 15, any incremented value greater than 15 is set to 15.

The QIndex, and thus the QFactor, can also vary from coefficient to coefficient (from array index to array index) if the quantization type is perceptual.

For uniform quantization, the coefficient QIndex is equal to the block QIndex, so the corresponding QFactor either multiplies (inverse quantization) or divides (quantization) each coefficient in the block.

For perceptual quantization, the coefficient QIndex depends on the value (0 . . . 63) of the index in the linear array. The following table gives the resulting coefficient QIndex as a function of the array index value.

| Coefficient QIndex | Array Index |
| --- | --- |
| Block QIndex | index < 12 |
| Block QIndex + 1 | 12 ≦ index < 28 |
| Block QIndex + 2 | 28 ≦ index < 52 |
| Block QIndex + 3 | 52 ≦ index |

Entropy Coding

Huffman/RLE coding processes the linear array of quantized DCT coefficients by:

1. Independently encoding non-zero coefficients with the fewest possible bits (because the DCT coefficients are uncorrelated).
2. Optimally encoding continuous "runs" of coefficients with zero values-especially at the end of the linear array (because of the zigzag ordering).

One suitable approach for the Huffman/RLE coding process is the Huffman/RLE coding process used for the AC coefficients in the well known JPEG still image compression standard.

To enable random access of blocks, this particular approach does not encode the DC frequency coefficient (index=0), but instead passes it on unaltered. The algorithm computes a series of variable-length code words, each of which describes:

1. The length, from zero to 15, of a run of zeros that precedes the next non-zero coefficient.
2. The number of additional bits required to specify the sign and mantissa of the next non-zero coefficient. The sign and mantissa of the non-zero coefficient follows the code word. One reserved code word signifies that the remaining coefficients in a block are all zeros.

Encoding

The encoding of all blocks uses the typical Huffman tables for AC coefficients from Annex K, section K.3.2 of ISO International Standard 10918. This includes Table K.5 for the luminance (Y) AC coefficients and Table K.6 for the chrominance (U and V) AC coefficients.

Decoding

The decoding of all blocks uses the same fixed tables as the encoding process. Therefore, it is never necessary to store or to convey the Huff-man tables with the data.

Lossless Compression\Decompression

In the compression engine 414 in the tiler, lossless compression occurs in two or three steps:

1. Convert incoming RGB data to a YUV-like luminance-chrominance system (optional).
2. Perform a differential prediction calculation on each color component. Encode the resulting coefficients using Huffman encoding with fixed code tables.

Lossless decompression in the decompression engines 404, 450 in the tiler and gsprite engine occurs in two or three steps:

1. Decode the incoming compressed data using Huffman decoding with fixed code tables.
2. Perform an inverse, differential prediction (reconstruction) on each color component.
3. Convert the colors in the YUV-like luminance-chrominance system to RGB colors if the compression process included this corresponding optional step.

Color Space Conversion

The color space conversion reversibly transforms the RGB colors to a brightness-color system with brightness coordinate Y and color coordinates U and V. This is a unique color space that improves the degree of compression even more than the YUV system above because the numbers entering the Huffman/RLE encoder are smaller, and hence more compressible. The color space conversion applies to each pixel independently and does not change the value of alpha.

RGB to YUV (for compression)

The conversion from integer RGB values to integer YUV values uses this transformation:

Y=G
U=R−G
V=B−G

YUV to RGB (for decompression)

The conversion from integer YUV values to integer RGB values uses this transformation:

R=Y+U
G=Y
B=Y+V

Alpha information is not altered during the color space transform.

The color space transform can be bypassed. The decompressor is notified in cases where the color transform is bypassed by a flag in a gsprite control data structure.

The prediction stage occurs after the color space transform. Prediction is a losslessly invertible step that reduces the entropy of most source images, particularly images with lots of blank space and horizontal and vertical lines.

In the prediction stage of compression and the inverse prediction stage of decompression:

1. p(x,y) are the pixel values input to the compressor and output from the decompression engine; and
2. d(x,y) are the difference values input to the coder in the next stage of the compression engine and output from the inverse of the coder in the decompression engine.

Prediction is computed as follows:

$d(x,y)=p(x,y)$ for $x=0, y=0$ $d(x,y)=p(x,y)-p(x,y-1)$ for $x=0, y>0$ $d(x,y)=p(x,y)-p(x-1,y)$ for $x>0$ Inverse prediction in the decompression engine is computed as follows:

$p(x,y)=d(x,y)$ for $x=0, y=0$ $p(x,y)=p(x,y-1)+d(x,y)$ for $x=0, y>0$ $p(x,y)=p(x-1,y)+d(x,y)$ for $x>0$ The Huffman/RLE coding and decoding is the same as for the lossy form of decompression/decompression in this implementation.

The compression methods described above compress images in independent blocks of 8×8 pixels. Therefore, in the chunking architecture described above, each compressed 32×32 pixel chunk consists of 16 such blocks. To facilitate compression of a 32×32 pixel chunk, the anti-aliasing engine 412 resolves pixel data into 8×8 pixel blocks. The 8×8 pixel blocks are buffered such that a first buffer is filled while a second buffer is compressed.

Controls and Parameters

As introduced above, the tiler (FIGS. 9A–9C) renders gsprites one chunk at a time. These chunks are comprised of pixel blocks (in this case, 16 8×8 pixel blocks). For texture mapping, shadowing, and some multi-pass rendering operations, the tiler fetches gsprite or texture blocks from memory. To compose a frame, the gsprite engine (FIG. 12A–B) fetches gsprite blocks, transforms pixels to screen space, and composites pixels in a compositing buffer.

There are a number of control parameters that govern processing of gsprites, chunks, and blocks. A gsprite display list stores a list of gsprites comprising a display image. This display list includes pointers to gsprites, and more specifically, gsprite header blocks. As described further below, the gsprite header block stores a number of attributes of a gsprite including gsprite width, height, and an affine transform defined in terms of a screen space parallelogram. The gsprite header block also includes a list of its member chunks. In one implementation, this list is in the form of pointers or handles to chunk control blocks.

Chunk control blocks include per chunk and per block parameters. The per chunk parameters include a YUV color converter bypass, default Q factors, a perceptual quantization flag, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format is an 8×8×4 array of pixels that encode 32 bit pixels (8 bits for RGB and Alpha).

The steps for retrieving a pixel given (X,Y) coordinates in a gsprite using the above control parameters include:

1) Divide Y and X by 32 to derive the chunk row and column, respectively.
2) Form the chunk number by: (chunk row) * (width of sprite in chunks)+chunk column.
3) Form the Chunk Control Block offset by: (chunk number) * (size of chunk header block))
4) Form the Block offset within the Chunk Control Block by: (Y<4:3>* 4+X<4:3>) * 3.
5) Send the Block pointer to the Decompressed cache logic, receive a Block.
6) Form the pixel offset within the Block by (Y<2:0>* 8)+X<2:0>

Here, a chunk offset is used to select a chunk. A block offset is then used to select a block pointer. The block pointer selects a block containing the pixel, and the pixel offset selects the pixel.

To access the block for a given pixel among compressed blocks of pixel data, the cache controls on the tiler and gsprite engine perform the following steps:

1) Form the MAU address by looking up the Block pointer value in the Chunk Control Block, and dividing by the size of the MAU.
2) Look up the number of MAUs allocated in the Chunk Control Block for this block.
3) Look up the next Block pointer address in the Chunk Control Block.
4) Form the length of the compressed block by: MAUs allocated * MAU size+2's complement of ((Block pointer) mod MAU size)+(next Block pointer) mod (MAU size)
5) Send the block address and the length of the compressed block to the Compressed Cache logic.

The compressed cache will read the first MAU, and if the length of the transfer has not been satisfied, then the pointer contained in the MAU will be used to access the start of the next MAU. This process continues, until the transfer length has been met.

To support MIP map texture operations, the tiler supports another level of indexing. One method for indexing a MIP map level includes the following steps:

1) For a given sprite, form a table of mip chunk level offsets by:
mipChunkOffset[0]=0 Offset for level of detail 0
For each level of mip map:
mipChunkOffset[level+1]=width of sprite/(2^level) * height of sprite/(2^level)+mipChunkOffset[level]

2) Use the LOD parameter to get the mip chunk offset. At this point, the mip chunk offset, width of sprite/(2^level), and height of sprite/(2^level) can be used to find any desired chunk within the chosen level of detail for the current gsprite.

We have described various aspects of a graphics rendering system, its architecture, and associated methods with references to several embodiments. While we have described several embodiments in detail, we do not intend to limit our invention to these specific embodiments. Our methods for retrieving and caching texture data can be applied to a variety of hardware implementations including frame buffer architectures or a chunking architecture as described above.

In view of the many possible embodiments to which the principles of our invention may be put, we emphasize that the detailed embodiments described above are illustrative only and should not be taken as limiting the scope of our invention. Rather, we claim as our invention all such embodiments as may come within the scope and spirit of the following claims and equivalents to these claims.

We claim:

1. Apparatus for accessing texture data in a graphics rendering system, the apparatus comprising:
    a set-up engine operable to receive geometric primitive data, and operable to produce texture references from the geometric primitive data;
    a first queue in communication with the set-up engine, the first queue operable to receive the texture references from the set-up engine and operable to buffer the texture references;
    a texture fetch unit coupled to the first queue and operable to issue a first set of requests for texture data corresponding to the texture references from memory;
    a texture cache operable to store the texture data; and
    a rasterizer in communication with the set-up engine, the rasterizer operable to issue a second set of requests for the texture data corresponding to the texture references and to compute pixel data from the geometric primitive data and the texture data fetched to the texture cache.

2. The apparatus of claim 1 wherein the texture data comprises a texture map.

3. The apparatus of claim 1 wherein the texture data comprises a shadow map.

4. The apparatus of claim 1 wherein the texture data includes a color table.

5. The apparatus of claim 1 further including a decompression unit in communication with the memory, the decompression unit operable to decompress compressed texture data and store the decompressed data in the texture cache.

6. The apparatus of claim 5 further including a compressed cache in communication with the memory, and the decompression unit, the compressed cache operable to temporarily store the compressed texture data retrieved from memory as the decompression unit decompresses compressed blocks of the compressed texture data.

7. The apparatus of claim 5 wherein the decompression unit is operable to perform decompression on texture blocks compressed using a discrete cosine transform form of compression.

8. The apparatus of claim 5 wherein the decompression unit is operable to perform decompression on texture blocks compressed using a lossless form of compression that includes Huffman and run length encoding.

9. The apparatus of claim 5 wherein the decompression unit includes two parallel decompression blocks.

10. The apparatus of claim 1 wherein the texture references comprise texture addresses, and the texture fetch unit includes a texture address generator operable to determine memory addresses of texture blocks stored in memory from the texture addresses.

11. The apparatus of claim 1 wherein the rasterizer includes a scan convert engine operable to interpolate color data, and a texture filter engine operable to filter texture data retrieved from the texture cache.

12. The apparatus of claim 1 wherein the set-up engine includes a pre-rasterizer operable to convert the geometric primitive data to the texture references.

13. Apparatus for accessing texture data in a graphics rendering system, the apparatus comprising:
    a first queue operable to store primitives;
    a pre-rasterizer in communication with the first queue, and operable to receive primitives from the first queue and convert the primitives into texture data requests;
    a second queue, the second queue in communication with the pre-rasterizer and operable to store the texture data requests;
    a texture cache;
    a texture fetch unit in communication with the second queue, the texture fetch unit operable to retrieve texture data from memory, and operable to store the texture data in the texture cache;
    a post-rasterizer in communication with the first queue, operable to receive the primitives from the first queue, the post-rasterizer in communication with the texture cache, and the post-rasterizer operable to rasterize the primitives using texture data retrieved from the texture cache.

14. The apparatus of claim 13 wherein the texture data requests comprise a list of texture blocks.

15. The apparatus of claim 13 wherein the pre-rasterizer is operable to control texture block replacement in the texture cache to prevent exceeding the memory capacity of the texture cache.

16. The apparatus of claim 13 wherein the pre-rasterizer is operable to compress texture data requests to a single request for each texture block retrieved from the memory.

17. The apparatus of claim 13 wherein the post-rasterizer is operable to remove the primitives from the queue after the post-rasterizer completes rasterizing each of the primitives.

18. The apparatus of claim 13 further including a decompression engine in communication with the memory, the decompression engine operable to receive compressed texture data and to decompress the compressed texture data and transfer the decompressed texture data to the texture cache.

19. A method for accessing texture data from memory during rendering operations performed in a graphics rendering system, the method comprising:
    queuing geometric primitives;
    converting the queued geometric primitives into texture references;
    queuing the texture references;
    fetching texture data blocks from memory;
    caching the texture data blocks in a texture cache;
    rasterizing the queued geometric primitives to generate output pixel data, the rasterizing step including accessing the texture data blocks as the texture blocks become available in the texture cache.

20. The method of claim 19 further including:
    decompressing compressed texture blocks fetched from the memory.

21. The method of claim 19 wherein the texture data includes a texture map or portion of a texture map.

22. Apparatus for accessing texture data in a graphics rendering system, the apparatus comprising:
    a rasterizer operable to receive geometric primitive data, and operable to generate pixel data including a texture request;
    a texture reference data queue in communication with the rasterizer, and operable to receive the pixel data;
    a texture fetch unit in communication with the texture reference data queue, operable to convert the texture requests into addresses of texture blocks in memory, and operable to fetch the texture blocks from the memory;

a texture cache in communication with the texture fetch unit, and operable to store the texture blocks; and a texture filter engine in communication with the texture cache and the texture reference data queue, and operable to read the pixel data from the texture reference data queue and to read texture samples from the texture cache and generate output pixels.

23. The apparatus of claim 22 further including a decompression unit in communication with the memory, the decompression unit operable to decompress blocks of compressed texture data.

24. The apparatus of claim 23 wherein the decompression unit includes two parallel decompression blocks.

25. The apparatus of claim 23 wherein the decompression unit is operable to perform a discrete cosine transform form of decompression.

26. The apparatus of claim 25 wherein the decompression unit is operable to perform a lossless Run Length decoding or a Huffman decoding.

27. The apparatus of claim 22 wherein the texture fetch unit is operable to control replacement of the texture blocks stored in the texture cache so that the memory capacity of the texture cache is not exceeded.

28. The apparatus of claim 22 wherein the texture request comprises a center of a texture sample area in coordinates of a texture map.

29. The apparatus of claim 22 wherein the texture reference data queue is operable to store the pixel data including interpolated color, an address for a destination pixel, and texture reference data.

30. A method for accessing texture data from memory during rendering operations performed in a graphics rendering system, the method comprising:

rasterizing geometric primitives to generate pixel elements, the pixel elements each including a pixel address, color data, and a texture request;

queuing the pixel elements in a queue;

reading a texture request from the queue;

converting the texture request into address of a texture block stored in memory;

fetching the texture block stored in memory;

caching the texture block in a texture cache;

repeating the reading, converting and fetching steps for additional pixel elements in the queue;

generating an output pixel by retrieving a pixel element from the queue, retrieving texture sample data from the texture cache, and combining the texture sample data with the color data for the pixel element; and repeating the generating step to generate additional output pixels.

31. The method of claim 30 wherein the fetching step includes:

retrieving a compressed texture block from the memory;

decompressing the compressed texture block; and storing the decompressed texture block in the texture cache.

32. The method of claim 31 wherein the fetching step further includes:

caching the compressed texture block.

33. The method of claim 31 wherein the compressed texture block is compressed using discrete cosine transform compression.

34. The method of claim 31 wherein the compressed texture block is compressed using Huffman and run length encoding.

35. The method of claim 30 including:

keeping track of the texture blocks cached in memory to avoid generating requests for the texture blocks already stored in the texture cache.

* * * * *